US009754492B2

(12) United States Patent
Del Vecchio et al.

(10) Patent No.: US 9,754,492 B2
(45) Date of Patent: Sep. 5, 2017

(54) SYSTEMS AND METHODS FOR PROVIDING SENSOR-BASED LOCATION PROXIMITY DETECTION AND NOTIFICATION

(71) Applicant: The Toronto-Dominion Bank, Toronto (CA)

(72) Inventors: Orin Del Vecchio, Richmond Hill (CA); Lauren Van Heerden, Bedford, NH (US); Gunalan Nadarajah, Milton (CA); Jonathan K. Barnett, Oakville (CA); Ashraf Metwalli, Toronto (CA); Jakub Danielak, Toronto (CA); Michael Loughry, Toronto (CA); Daniel M. Siegel, Toronto (CA); Nikolas Sawtschuk, Mississauga (CA); Sultan Mehrabi, Toronto (CA); Paul Mon-Wah Chan, Markham (CA); Matthew Hamilton, Toronto (CA); Christianne Moretti, Richmond Hill (CA); John Barbon, London (CA)

(73) Assignee: The Toronto-Dominion Bank, Toronto (CA)

( * ) Notice: Subject to any disclaimer, the term of this patent is extended or adjusted under 35 U.S.C. 154(b) by 47 days.

(21) Appl. No.: 14/794,038

(22) Filed: Jul. 8, 2015

(65) Prior Publication Data

US 2016/0014564 A1    Jan. 14, 2016

(51) Int. Cl.
*G08G 1/00* (2006.01)
*G06Q 10/10* (2012.01)
*H04W 4/02* (2009.01)

(52) U.S. Cl.
CPC ......... *G08G 1/205* (2013.01); *G06Q 10/109* (2013.01); *G08G 1/20* (2013.01); *H04W 4/022* (2013.01); *H04W 4/023* (2013.01)

(58) Field of Classification Search
CPC ....... H04W 4/02; H04W 4/023; H04W 4/022; G08G 1/207; G08G 1/205; G08G 1/20; G06Q 10/109; G06Q 10/1095
See application file for complete search history.

(56) References Cited

U.S. PATENT DOCUMENTS

| 6,424,910 | B1 | 7/2002 | Ohler et al. |
| 6,700,506 | B1 | 3/2004 | Winkler et al. |

(Continued)

FOREIGN PATENT DOCUMENTS

| EP | 1705932 | 9/2006 |
| EP | 2282168 | 2/2011 |
| GB | 2423889 | 9/2006 |

OTHER PUBLICATIONS

Hermann et al., "Concept for Hierarchical and Distributed Processing of Area Based Triggers," Fourth Annual IEEE International Conference on Pervasive Computing and Communications, 2006 (11 pages).

(Continued)

*Primary Examiner* — Vladimir Magloire
*Assistant Examiner* — Donald H Braswell
(74) *Attorney, Agent, or Firm* — Duane Morris LLP

(57) ABSTRACT

The disclosed embodiments include methods and systems for providing a notification relating to a geographical boundary based on monitored sensor data collected by networked devices. The disclosed embodiments include, for example, a method that monitors positional sensor data received from one or more triggering devices. The method may calculate a first boundary extent delimiting the geographical area of the first boundary based on one or more boundary extent parameters. The method may also detect an occurrence of a triggering condition that impacts a movement of at least one of a client device or at least one of the triggering devices within a geographic region that includes the first location. In (Continued)

response to the detected triggering event, at least one of modified start time or a second location may be established for the event, which may be provided to the client and triggering devices in a notification.

32 Claims, 10 Drawing Sheets

(56) References Cited

U.S. PATENT DOCUMENTS

| | | | |
|---|---|---|---|
| 6,748,320 | B2 | 6/2004 | Jones |
| 6,804,606 | B2 | 10/2004 | Jones |
| 6,823,188 | B1 | 11/2004 | Stern |
| 6,980,131 | B1 | 12/2005 | Taylor |
| 7,273,172 | B2 | 9/2007 | Olsen, III et al. |
| 7,289,814 | B2 | 10/2007 | Amir et al. |
| 7,561,063 | B2 | 7/2009 | Eckhart |
| 7,822,426 | B1 | 10/2010 | Wuersch |
| 7,999,701 | B1 | 8/2011 | Xu et al. |
| 8,115,625 | B2 | 2/2012 | Yoshioka et al. |
| 8,125,332 | B2 | 2/2012 | Curran et al. |
| 8,165,773 | B1 | 4/2012 | Chavez et al. |
| 8,204,682 | B2 | 6/2012 | Hatami |
| 8,243,897 | B2 | 8/2012 | Groth |
| 8,284,076 | B1 | 10/2012 | Horstemeyer |
| 8,326,315 | B2 | 12/2012 | Phillips et al. |
| 8,441,367 | B1 | 5/2013 | Lee et al. |
| 8,531,293 | B2 | 9/2013 | Putz |
| 8,536,999 | B2 | 9/2013 | Holcman et al. |
| 8,538,458 | B2 | 9/2013 | Haney |
| 8,588,814 | B2 | 11/2013 | Jayanthi |
| 8,593,277 | B2 | 11/2013 | Nath et al. |
| 8,624,723 | B2 | 1/2014 | Troxler |
| 8,626,184 | B2 | 1/2014 | Dicke |
| 8,644,848 | B2 | 2/2014 | Williams et al. |
| 8,645,050 | B2 | 2/2014 | Gontmakher et al. |
| 8,653,956 | B2 | 2/2014 | Berkobin et al. |
| 8,666,660 | B2 | 3/2014 | Sartipi et al. |
| 8,682,363 | B1 | 3/2014 | Cardi et al. |
| 8,686,852 | B2 | 4/2014 | Ben-Dayan et al. |
| 2005/0157689 | A1 | 7/2005 | Schnurr |
| 2006/0111955 | A1 | 5/2006 | Winter et al. |
| 2007/0210936 | A1 | 9/2007 | Nicholson |
| 2008/0167937 | A1* | 7/2008 | Coughlin ............... G01C 21/20 705/7.16 |
| 2009/0017803 | A1* | 1/2009 | Brillhart ............... G01C 21/20 455/414.2 |
| 2010/0042940 | A1 | 2/2010 | Monday et al. |
| 2010/0191454 | A1 | 7/2010 | Shirai et al. |
| 2011/0148626 | A1 | 6/2011 | Acevedo |
| 2012/0239584 | A1 | 9/2012 | Yariv et al. |
| 2013/0103606 | A1 | 4/2013 | Holliday |
| 2013/0130718 | A1 | 5/2013 | Sharma et al. |
| 2013/0311567 | A1 | 11/2013 | Lee |
| 2013/0331087 | A1 | 12/2013 | Shoemaker et al. |
| 2013/0331127 | A1 | 12/2013 | Sabatelli et al. |
| 2013/0332067 | A1 | 12/2013 | Schlesinger et al. |
| 2014/0074743 | A1 | 3/2014 | Rademaker |
| 2014/0135039 | A1* | 5/2014 | Sartipi ............... H04W 4/021 455/456.3 |
| 2014/0171013 | A1* | 6/2014 | Varoglu ............... H04W 4/22 455/404.2 |
| 2014/0179344 | A1 | 6/2014 | Bansal et al. |

OTHER PUBLICATIONS

Munson et al., "Location-based notification as a general-purpose service," Proceedings of the $2^{nd}$ International Workshop on Mobile Commerce, 2002, pp. 40-44.

Safar et al., "Virtual Social Networks Online and Mobile Systems," $1^{st}$ International Conference on the Applications of Digital Information and Web Technologies, 2008 (8 pages).

"Locqus releases en route notifications, enabling businesses to update real-time eta for customers," Manufacturing Close-Up, Mar. 23, 2014 (2 pages).

Hsieh et al., "Experimental Validation of an Algorithm for Cooperative Boundary Tracking," Proceedings of the American Control Conference, 2005, pp. 1078-1083.

An et al., "A Gaussian Mixture Model for Mobile Location Prediction," Research, Innovation and Vision for the Future. 2007, pp. 152-157.

Šikšnys et al. "Private and Flexible Proximity Detection in Mobile Social Networks," Eleventh International Conference on Mobile Data Management, 2010 (10 pages).

Li et al., "Nearby Friend Alert: Location Anonymity in Mobile Geosocial Networks," Pervasive Computing, vol. 12, No. 4, 2013, pp. 62-70.

Al-Mazloum et al., "GPS and SMS-Based Child Tracking System Using Smart Phone," International Journal of Electrical, Electronic Science and Engineering, vol. 7, No. 2, 2013, pp. 1-4.

* cited by examiner

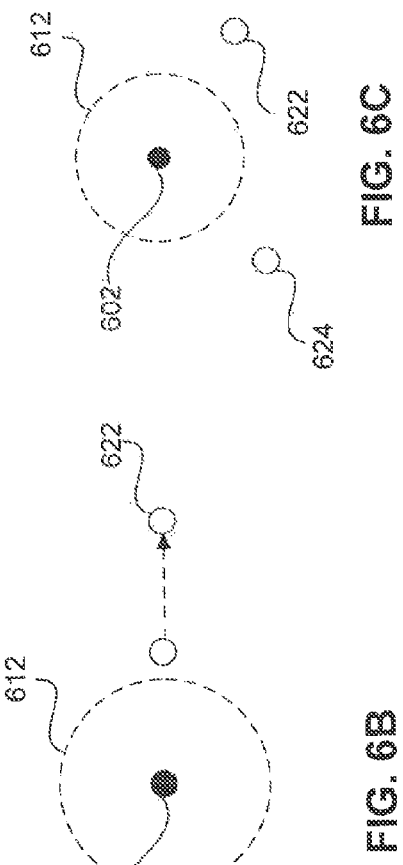
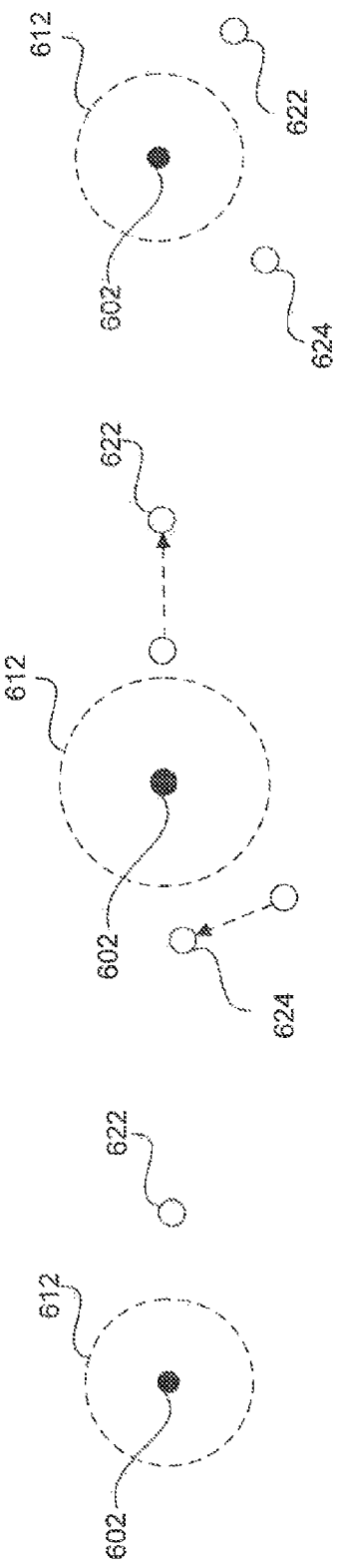
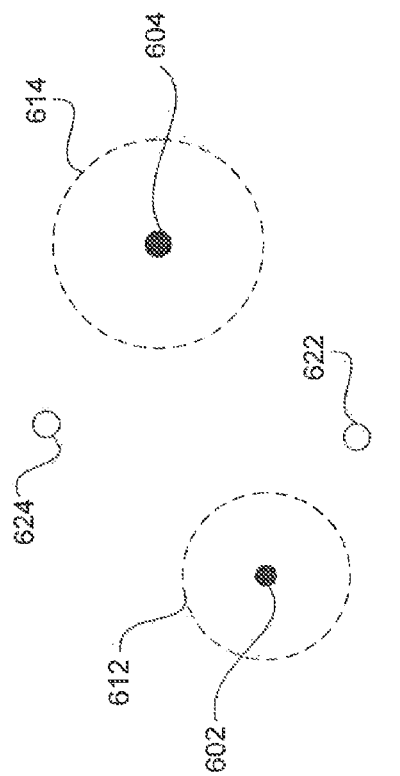
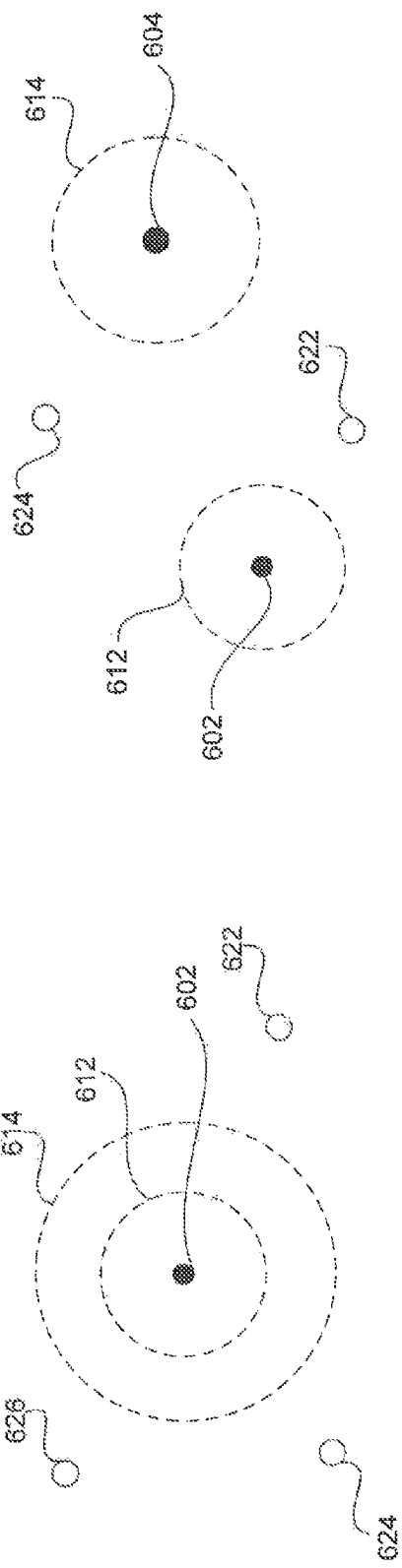

SYSTEMS AND METHODS FOR PROVIDING SENSOR-BASED LOCATION PROXIMITY DETECTION AND NOTIFICATION

CROSS-REFERENCE TO RELATED APPLICATIONS

This application claims the benefit of priority to U.S. Provisional Patent Application No. 62/022,119, filed Jul. 8, 2014, the entire disclosure of which is expressly incorporated herein by reference to its entirety.

BACKGROUND

Technical Field

The disclosed embodiments generally relate to systems, methods, and apparatuses for proximity detection, and for example, and without limitation, to systems and methods for providing proximity detection and notification processes based on monitored sensor data obtained from network devices.

Background

Today, people often find themselves waiting at a particular location for another individual, a service, or other entity. For example, goods and service providers give their customers fixed or variable periods of time in which the customer must remain in his or her home to await a service. Many customers, however, find it cumbersome to remain in their homes for long stretches of time, and would benefit from the ability to run errands or receive real-time updates on the expected arrival time of a service.

Aspects of the disclosed embodiments include systems and methods to providing dynamic proximity detection about a fixed location.

SUMMARY

The disclosed embodiments include systems and methods for providing dynamic proximity detection about a fixed location.

The disclosed embodiments include, for example, a system that includes a storage device and at least one processor coupled to the storage device. The storage device may store instructions for controlling the at least one processor when executed by the at least one processor. Further, the at least one processor may be operative with the instructions to determine at least one first boundary extent parameter relevant to an expected arrival time of one or more client and triggering devices at a first location of an event. The at least one processor may also be operative with the instructions to monitor the one or more client and triggering devices to obtain first boundary extent information reflecting the at least one first boundary extent parameter. The one or more client and triggering devices may, in one aspect, be connected to the system across a corresponding network. The at least one processor may be further operative with the instructions to calculate, based on the first boundary extent information, a first boundary extent delimiting a first geographical area of a first boundary disposed about the first location. In additional, the at least one processor may be operative with the instructions to detect an occurrence of at least one triggering condition impacting a movement of at least one of the client or triggering devices within a geographic region that includes the first location, and in response to the detected triggering condition, determine at least one of a (i) a modified start time for the event or (ii) a second location for the event. The at least one processor may also be operative with the instructions to transmit a first notification to the at least one client device or triggering device, the first notification comprising information identifying the at least one modified start time or the second location. In some aspects, the information may instruct the at least one client or triggering device to present the first notification to a corresponding user.

The disclosed embodiments also include a computer-implemented method that determines, by one or more processors, at least one first boundary extent parameter relevant to an expected arrival time of one or more client and triggering devices at a first location of an event. The method also includes monitoring, by the one or more processors, the one or more client and triggering devices to obtain first boundary extent information reflecting the at least one first boundary extent parameter. The method further calculates, by the one or more processors, and based on the first boundary extent information, a first boundary extent delimiting a first geographical area of a first boundary disposed about the first location. The method also includes detecting, by the one or more processors, an occurrence of at least one triggering condition impacting a movement of at least one of the client or triggering devices within a geographic region that includes the first location, and in response to the detected triggering condition, determining, by the one or more processors, at least one of a (i) a modified start time for the event or (ii) a second location for the event. The method also transmits, by the one or more processors, a first notification to the at least one client or triggering device. In some aspects, the first notification comprising information identifying the at least one modified start time or the second location, the information instructing the at least one client or triggering device to present the first notification to a corresponding user.

In additional embodiments, a tangible, non-transitory computer-readable medium stores instructions that, when executed by at least one processor, cause the at least one processor to perform a method. The method may include determining at least one first boundary extent parameter relevant to an expected arrival time of one or more triggering devices at a first location of an event. The method may also include monitoring the one or more triggering devices to obtain first boundary extent information reflecting the at least one first boundary extent parameter, and calculating and based on the first boundary extent information, a first boundary extent delimiting a first geographical area of a first boundary disposed about the first location. The method may further detect an occurrence of at least one triggering condition impacting a movement of at least one of the client or triggering devices within a geographic region that includes the first location, and in response to the detected triggering condition, determining least one of a (i) a modified start time for the event or (ii) a second location for the event. The method also includes transmitting a first notification to the at least one client or triggering device. In some aspects, the first notification comprising information identifying the at least one modified start time or the second location, the information instructing the at least one client or triggering device to present the first notification to a corresponding user.

Additional objects and advantages of the disclosed embodiments will be set forth in part in the description that follows, and in part will be obvious from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

FIGS. 6A-6E depicts exemplary boundary extent configurations consistent with the disclosed embodiments.

DESCRIPTION OF THE EMBODIMENTS

Reference will now be made in detail to embodiments of the present disclosure, examples of which are illustrated in the accompanying drawings. Wherever possible, the same reference numbers will be used throughout the drawings to refer to the same or like parts.

The disclosed embodiments include systems and methods that enable a user to receive notifications indicative of a presence of a triggering device within a predetermined distance or travel time of a specified geographic location. For instance, a user, Joe, may be working from his home office for the day when he experiences a total loss of cable internet connectivity. After discussions with his cable provider, Joe schedules a service appointment during a temporal window from 12:00 p.m. to 5:00 p.m. Rather than waiting for the repair crew to arrive, Joe decides to travel into the office, which without traffic would require thirty minutes, but with rush hour traffic, could require forty-five to sixty minutes. The disclosed embodiments may be configured to enable Joe, through, for example, a mobile device, to transmit his current location to a computerized system, which may establish a virtual boundary about Joe's current location. The computerized system may, for example, be configured to monitor a position, speed, and/or direction of Joe's mobile device (and thus, of Joe himself) relative to a comparable position, speed, and/or direction of one or more mobile devices and/or computer systems associated with the repair crew. In some aspects, the computerized system may be configured to adjust the virtual boundary to ensure that a travel time between Joe's current geographic position (e.g., as established by Joe's mobile device) and Joe's home is less than a time required by the repair crew to travel from the virtual boundary to Joe's home. When the computerized system detects that the at least one of the repair crew's mobile devices intersect the virtual boundary, the computerized system may provide a notification to Joe's mobile device. In response to the notification, Joe may travel home from the office with confidence that he will arrive before the repair crew. This example is one of many applications that the disclosed embodiments may be implemented. Other aspects, features, and functionalities of the disclosed embodiments are described below.

Figure 1:
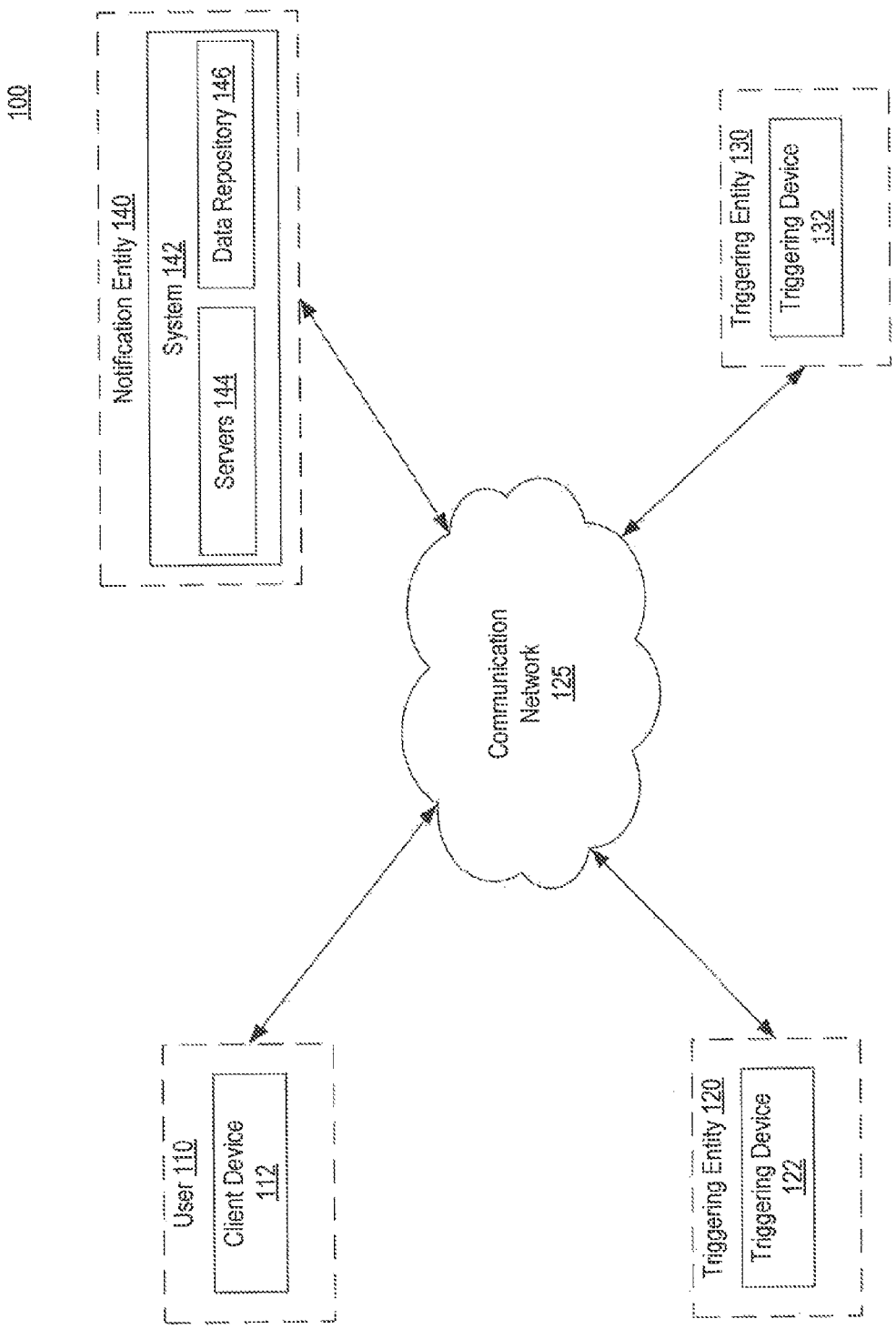
FIG. 1 depicts an exemplary computing environment consistent with disclosed embodiments.

FIG. 1 depicts an exemplary computing environment 100 consistent with the disclosed embodiments. In one aspects, computing environment 100 may include one or more systems (e.g., system 142), which may be associated with one or more notification entities (e.g., entities 140). In additional aspects, environment 100 may include one or more client devices (e.g., client devices 112), which may be associated with respective one or more users (e.g., users 110, 120, and 132). Environment 100 may also include one or more triggering devices (e.g., triggering devices 122 and 132), which may be associated with one or more triggering entities (e.g., triggering entities 120 and 130). In some aspects, one or more of triggering devices 122 and 132 may be in possession of a corresponding one of triggering entities 120 and 130 (e.g., a smart phone carried by a user). Additionally or alternatively, one or more of triggering devices 122 and 132 may be owned by or under the control of one or more of triggering entities 120 and 130 (e.g., a drone operated by a user). The exemplary triggering entities described above are not limited to single or multiple users, and in additional embodiments, triggering entities 120 and/or 130 may include one or more organizations, business entities, governmental entities, and other non-human entities (e.g., delivery services, transit agencies, etc.). Further, in additional aspects, triggering devices 122 and/or 132 may include, but are not limited to, drones (e.g., to deliver packages, etc.), automated and/or driverless cars, and automated and/or driverless transit vehicles (e.g., automated subways).

In some embodiments, environment 100 may include communication network 125. In some aspects, communication network 125 may represent any type of network or medium of digital communication for transmitting information between computing devices. For example, communication network 125 may include a LAN, a wireless LAN, a cellular network, a GSM network, a satellite network, an RF network, a Near Field Communication (NFC) network (e.g., a WiFi network), a wireless Metropolitan Area Network (MAN) connecting multiple wireless LANs, NEC communication link(s), any physical wired connection (e.g., via an I/O port), and a WAN (e.g., the Internet). In some embodiments, communication network 125 may be secured through physical encryption (e.g., line encryption), by requiring information to be encrypted on other computer systems (e.g., end encryption), and the like.

In certain aspects, communication network 125 may include any accessible network or networks interconnected via one or more communication protocols, including hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. In some aspects, communication network 125 may also include one or more mobile device networks, such as a GSM network or a PCS network, allowing devices (e.g., client device 112, a triggering device, etc.) to send and receive data via applicable communications protocols, including those described herein.

In certain aspects, environment 100 may include one or ore systems (e.g., system 142) configured to process, store, receive, obtain, and transmit information. In certain aspects, system 142 may be configured to execute software instructions to perform one or more processes consistent with the disclosed embodiments. In one aspect, system 142 may be associated with one or more notification entities (e.g., notification entity 140), although such association is not required.

In some embodiments, notification entity 140 may include any entity storing, using, managing, or processing information related to providing proximity detection for a user or other entity. For example, in some aspects, a notification entity may include a business entity (e.g., a merchant, a cable company, a delivery service, a restaurant), financial institution, a governmental entity (e.g., a federal government agency, state or local body, a court, regulatory bodies, law enforcement, etc.), an educational entity (e.g., a university, local school, school board, etc.), a courier service (e.g., a post office, a private shipping or logistics service, etc.), other users, and the like. In some aspects, a financial institution may include a commercial bank, an investment bank, a provider of financial service accounts (e.g., checking, savings, credit, debit, reward, loyalty accounts, etc.), or a provider of payment instruments (e.g., a credit card, a debit card, a prepaid card, check instruments, etc.).

In certain aspects, system 142 may include one or more servers (e.g., servers 144), and one or more data storages (e.g., data repository 146). In some embodiments, server 144 may include software programs and one or more processors for executing the programs. Server 144 may be configured to execute software instructions to perform one or more processes consistent with the disclosed embodiments. In one embodiment, for example, a user device (e.g., devices 112, 122, and/or 132) and/or another computing system may exchange information facilitating execution of the one or more processes consistent with the disclosed embodiments. The software instructions of server 144 may be incorporated into a single computer, a single server, or any additional or alternative computing device apparent to one of ordinary skill in the art. Server 144 may also include distributed computing devices and computing systems, and may execute software instructions on separate computing systems and servers. System 142 may include one or more data repositories 146 configured to store information consistent with the disclosed embodiments (e.g., information related to, obtained from, and/or sent to triggering devices, user preferences received over communication network 125, etc.).

In some aspects, system 142 may include a computer having one or more processors selectively activated or reconfigured by a computer program. Such a computer may be configured as a particular computing system based on execution of software instructions that perform one or more processes consistent with the disclosed embodiments. In certain aspects, system 142 may be incorporated as corresponding nodes in a distributed network, and/or as corresponding networked servers in a cloud-computing environment. In one embodiment, system 142 may communicate with one or more additional servers that facilitate the distribution of processes for parallel execution by the additional servers.

In some embodiments, environment 100 may include one or more client devices (e.g., client device 112) and/or triggering device(s) (e.g., triggering devices 122 and/or 132). In certain embodiments, a client device and/or triggering device may include any computing, data transmitting, data receiving, or data processing device consistent with the disclosed embodiments. In some aspects, a triggering device may include a client device. In other embodiments, a client device may not be a triggering device.

In certain aspects, a client device or triggering device may include any device capable of providing and receiving information over a communication network (e.g., communication network 125). For example, a client device or triggering device may include a personal computer, a laptop computer, a tablet computer, a notebook computer, a handheld computer, a personal digital assistant, a portable navigation device, a mobile phone, a wearable device (e.g., a smart watch), an embedded device, a smartphone, an RFID device, a pager, and any additional or alternate device capable of receiving or providing information to communications network 125 (e.g., a computer system 200 of FIG. 2). Additionally or alternatively, client and triggering devices consistent with the disclosed embodiments may include a positioning device or sensor (e.g., global positioning system (GPS) unit, an RFID unit, etc.) capable obtaining positioning data indicative of a current geographic position of the corresponding client and/or triggering device. In certain aspects, the client and/or triggering devices may process the received positional data and transmit portions of the received positioning data to system 142 at regular or predetermined intervals, and/or in response to requests received from system 140. As described below, system 140 may process the received positional data to monitor current geographic positions of the client and/or triggering devices relative to each other and to one or more triggering locations.

In some embodiments, a client device may be associated with one or more users (e.g., user 110). In one example, a user may use client device to perform one or more processes consistent with the disclosed embodiments. For example, user 110 may use client device 112 to input information and to exchange information with other systems in environment 100, such as system 142 or another computing system in connection with communications network 125.

In certain embodiments, a triggering device may be configured to receive, process, and provide information over communications network 125 for use in processes consistent with the disclosed embodiments. In some aspects, a triggering device may be associated with one or ore triggering entities (e.g., entities 120 and 130). In some aspects, a triggering entity may include any entity storing, using, requiring, managing, or processing information related to providing proximity detection for a user or other entity (e.g., any of the entities described in connection with notification entity 140, a separate business entity, a human user, etc.). In some embodiments, a triggering entity may be related to, concomitant with, or associated with notification entity 140, although such relationship is not required. In certain embodiments, system 142 may receive authorization from another computing system (e.g., a computing system associated with a notification entity 140, triggering entity 130, etc.) before system 142 is authorized or permitted to track and monitor a triggering device.

While FIG. 1 depicts environment 100 with a certain number of client devices (e.g., client device 112), triggering devices (e.g., triggering devices 122 and 132), communication networks 120, and systems 142, environment 100 may contain any number of such systems consistent with the disclosed embodiments. For example, environment 100 may include a plurality of client devices, each associated with a plurality of users. In certain aspects, environment 100 may include three or more triggering devices, which each may be associated with triggering entities (e.g., one or more users, business entities, etc.). Environment 100 may also include additional communication networks, and other networks not shown in FIG. 1 consistent with the disclosed embodiments.

Figure 2:
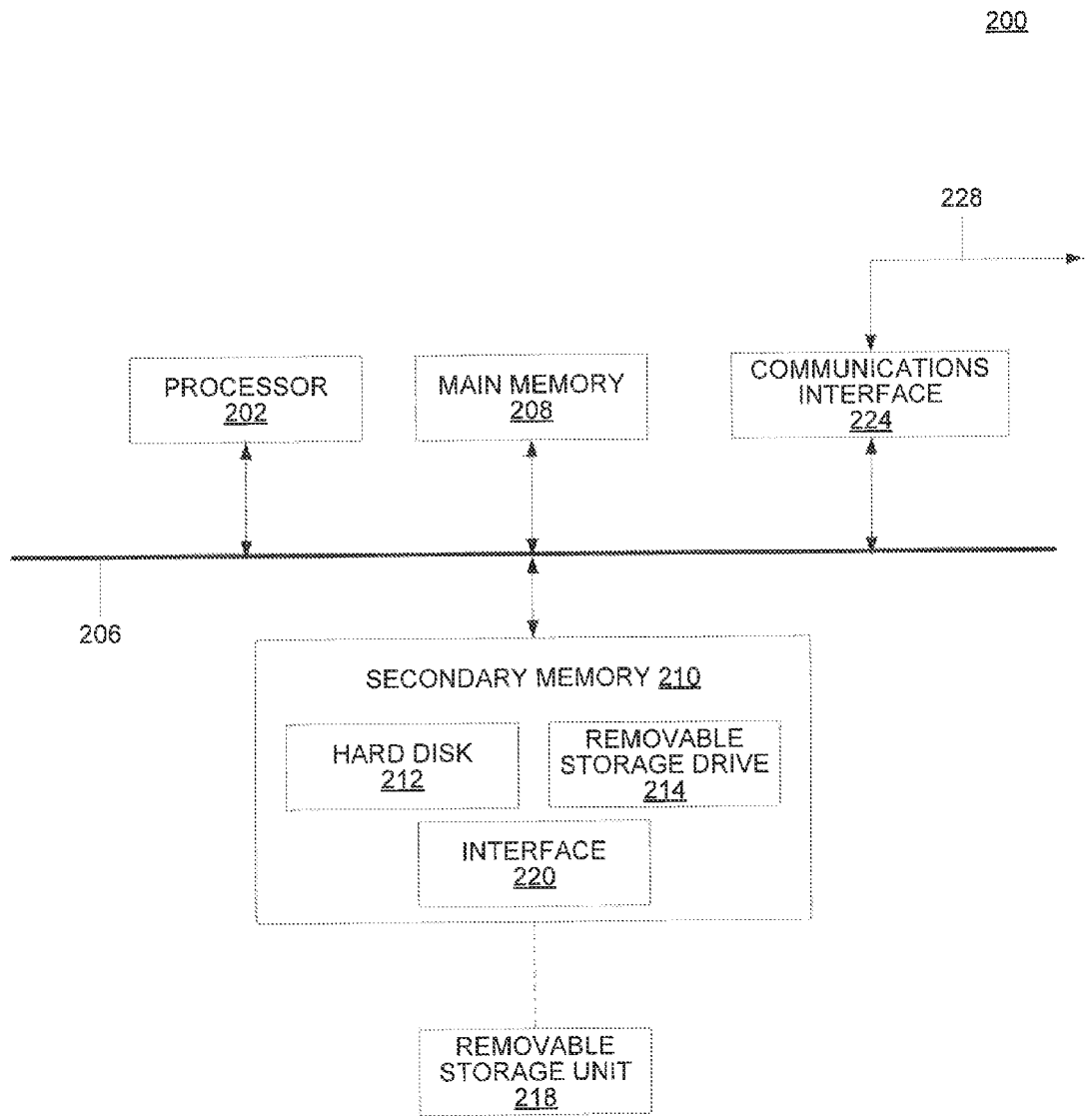
FIG. 2 depicts an exemplary computing system consistent with the disclosed embodiments.

FIG. 2 depicts a block diagram of exemplary computer system 200 with which certain aspects consistent with the disclosed embodiments may be implemented. For example, in some aspects, computer system 200 may reflect computer systems associated with a client device (e.g., client device 112, 122, 132, etc.), system 142, and the like. In some embodiments, computer system 200 may include one or more processors 202 connected to a communications backbone 206 such as a bus or external communications network (e.g., any medium of digital data communication such as a LAN, MAN, WAN, cellular network, WiFi network, NFC link, Bluetooth, GSM network, PCS network, communication network 125, and any associated protocols such as HTTP, TCP/IP, RFID, etc.).

In certain aspects, computer system 200 may include main memory 208. Main memory 208 may comprise random access memory (RAM) representing a tangible and non-transitory computer-readable medium storing computer programs, sets of instructions, code, or data executed with processor 202. When executed by processor 202, such instructions, computer programs, etc., enable processor 202 to perform one or more processes or functions consistent with the disclosed embodiments. In some aspects, such instructions may include machine code (e.g., from a compiler) and/or files containing code that processor 202 may execute with an interpreter.

In some aspects, main memory 208 may also include or connect to a secondary memory 210. Secondary memory 210 may include a disk drive 212 (e.g., HOD, SSD), and/or a removable storage drive 214, such as a magnetic tape drive, flash memory, an optical disk drive, CD/DVD drive, or the like. The removable storage drive 214 may read from and/or write to a removable storage unit 218 in a manner known to the skilled artisan. Removable storage unit 218 may represent a magnetic tape, optical disk, or other storage medium that is read by and written to by removable storage drive 214. Removable storage unit 218 may represent a tangible and non-transitory computer-readable medium having stored therein computer programs, sets of instructions, code, or data to be executed by processor 202.

In other embodiments, secondary memory 210 may include other means for allowing computer programs or other program instructions to be loaded into d computer system 200. Such means may include, for example, another removable storage unit 218 or an interface 220. An example of such means may include a removable memory chip (e.g., EPROM, RAM, ROM, DRAM, EEPROM, flash memory devices, or other volatile or nonvolatile memory devices) and associated socket, or other removable storage units 218 and interfaces 220, which allow instructions and data to be transferred from the removable storage unit 218 to computer system 200.

Computer system 200 may also include one or more communications interfaces 224. Communications interface 224 may allow software and data to be transferred between computer system 200 and external systems (e.g., in addition to backbone 206). Communications interface 224 may include a modem, a network interface (e.g., an Ethernet card), a communications port, a PCMCIA slot and card, etc. Communications interface 224 may transfer software and data in the form of signals, which may be electronic, electromagnetic, optical or other signals capable of being received by communications interface 224. These signals may be provided to communications interface 224 via a communications path (i.e., channel 228). Channel 228 carries signals and may be implemented using wire, cable, fiber optics. RF link, and/or other communications channels. In one embodiment, the signals comprise data packets sent to processor 202. Information representing processed packets may also be sent in the form of signals from processor 202 through communications path 228.

In certain aspects, the computer-implemented methods described herein can be implemented on a single processor of a computer system, such as processor 202 of computer system 200. In other embodiments, these computer-implemented methods may be implemented using one or more processors within a single computer system and/or on one or more processors within separate computer systems in communication over a network.

In certain embodiments in connection with FIG. 2, the terms "storage device" and "storage medium" may refer to particular devices including, but not limited to, main memory 208, secondary memory 210, a hard disk installed in hard disk drive 212, and removable storage unit 218. Further, the term "computer-readable medium" may refer to devices including, but not limited to, a hard disk installed in hard disk drive 212, any combination of main memory 208 and secondary memory 210, and removable storage unit 218, which may respectively provide computer programs and/or sets of instructions to processor 202 of computer system 200. Such computer programs and sets of instructions can be stored within one or more computer-readable media. In certain aspects, computer programs and sets of instructions may also be received via communications interface 224 and stored on the one or more computer-readable media.

The disclosed embodiments include systems, methods, and computer-readable mediums for storing instructions that, when executed by a processor(s), perform operations for notifying users when one or more devices associated with specified persons and/or specified business entities cross or are present within a geographic boundary (e.g., proximity detection). In certain embodiments, the geographic boundary may be associated with an expected arrival time of the one or more devices at a particular location. In some aspects, the disclosed embodiments may monitor the one or more devices relevant to the user, and may dynamically calculate one or more geographical boundaries based on information associated with the one or more monitored devices. In certain aspects, the disclosed embodiments may determine whether at least one of the monitored devices intersects and/or is disposed within the boundary, and provide a notification to a device of a user based on the determination.

In some aspects, the disclosed embodiments include notifying the user device under other conditions based on information associated with the one or more monitored devices. By way of example, notifications consistent with the disclosed embodiments may include, but are not limited to, notifications that at least one of the persons and/or specific business entities is delayed and will be unable to arrive at the particular location at the expected arrival time (e.g., at a previously scheduled meeting at an office), and notifications that the expected arrival time (e.g., a start time of the previously scheduled meeting) has been rescheduled to accommodate the delay, as described below.

Figure 3A:
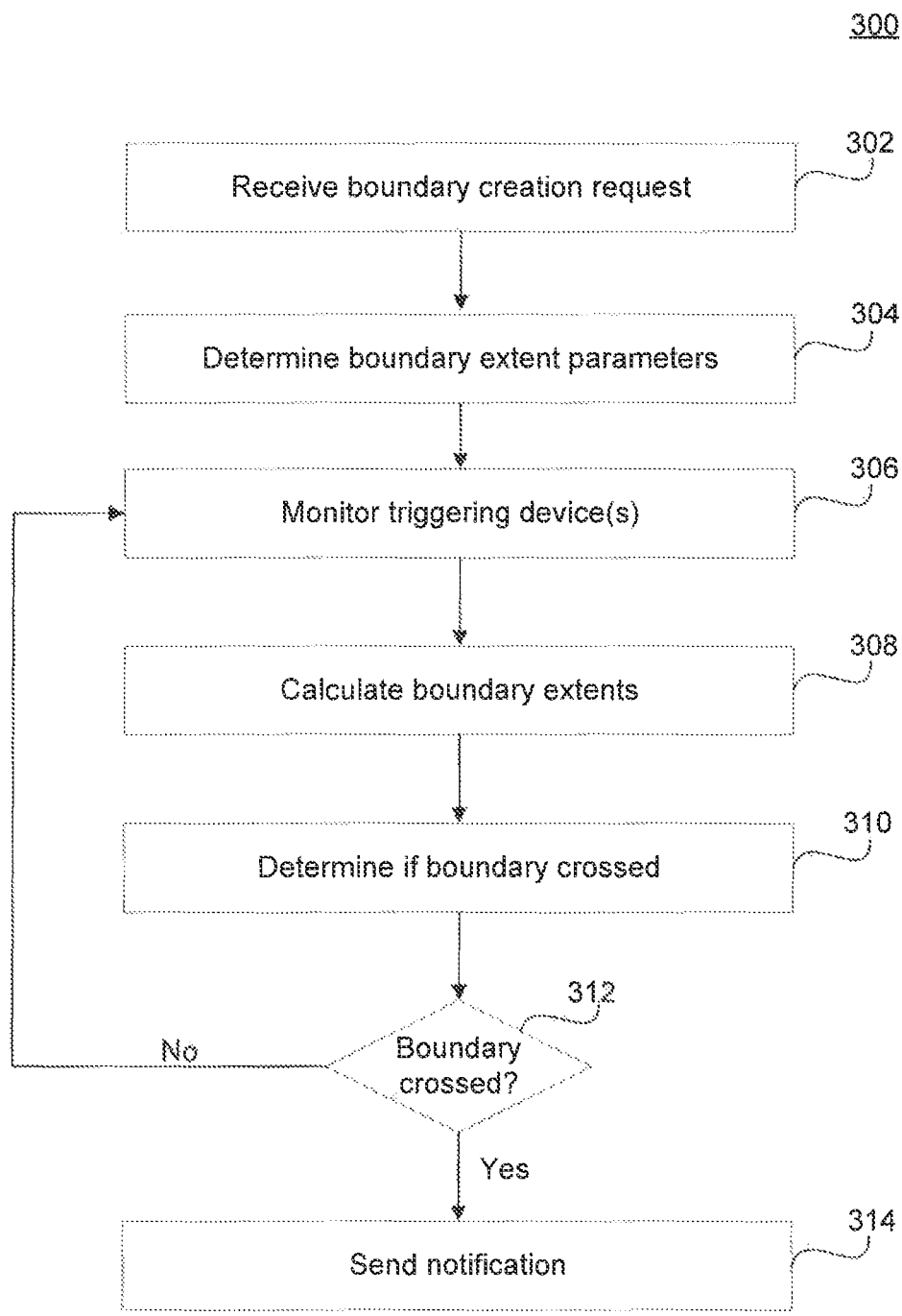
FIG. 3A depicts a flowchart for an exemplary proximity notification process consistent with the disclosed embodiments.

For example, FIG. 3A depicts a flowchart for an exemplary proximity notification process 300 consistent with the disclosed embodiments. In some aspects, system 142 may be configured to receive a boundary creation request consistent with the disclosed embodiments (e.g., in step 302). In certain aspects, a boundary creation request may reflect an indication from a user to monitor devices related to the request (e.g., one or more triggering devices 122, 132, etc.) and determine the expected arrival time of one or more monitored devices at a particular target location or locations.

Based on the received boundary creation request, system 142 may determine a current location of client device 112, and establish (e.g., "freeze") the current location as the target location for a predetermined time period. In certain aspects, user 110 may leave the target location during the predetermined time (e.g., to run errands, etc.), and system 142 may monitor geographic locations of client device 112 (and of triggering devices 122 and 132). System 142 may, for example, be configured to compute times required for user 110 and triggering entities 120 and 130 to travel from their respective geographic locations to the target location. By way of example, the travel times may be computed based on geographic data stored within various data stores (e.g., data repository 146 of FIG. 1), based on a current travel speed (e.g., as obtained from external positioning systems), current weather and traffic conditions, and/or a street grid associate with the geographic region.

In certain aspects, user 110 may wish to arrive back at the target location before the arrival of one or more of triggering entities 120 and 130. For example, triggering entity 130 may be associated with a cable provider that scheduled service call at user 110's home (e.g., the target location), between 12:00 p.m. and 6:00 p.m. Rather than waiting at home during the six-hour interval, user 110 may elect to leave the home and perform one or more errands within a local shopping area, The disclosed embodiments may, for example, be configured to monitor current geographic locations of client device 112 and triggering device 122 and 132, and to provide a notification to user 110 (e.g., through client device 112) that user 110 should travel back to the target location in order to arrive before the service personnel of the cable provider (e.g., associated with one or triggering devices 122 or 132). In some aspects, and upon receipt of the boundary creation request from client device 112, system 142 may establish a geographic buffer zone that includes the target location and is bounded by one or more virtual boundaries.

Figure 3B:
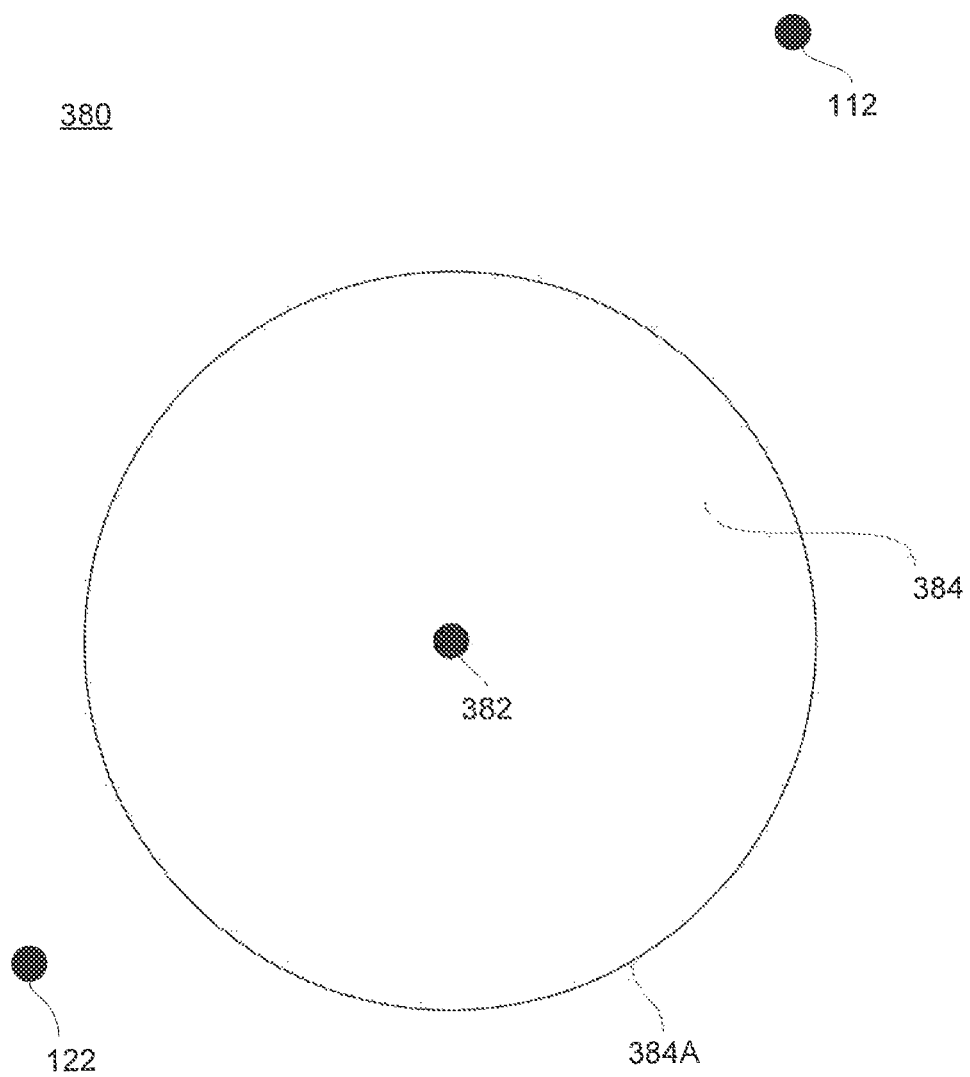
FIGS. 3B-3D depict exemplary boundary extent configurations consistent with the disclosed embodiments.

By way of example, as illustrated in FIG. 3B, system 142 may have established a target location 382 within geographic region 380, as described above, and may establish a geographic buffer zone 384 that includes target location 382 and is bounded by virtual boundary 384A. The number, location, size, extent, contours, shape, asymmetry, etc. of the virtual boundaries may depend on information consistent with the disclosed embodiments. In certain aspects, system 142 may determine the size of geographic buffer zone 384 and the location of virtual boundary 384A such that a time required by triggering entity 120 to travel from virtual boundary 384A to target location 382 exceeds a time required for user 110 to travel from its current geographic location to target location 382.

In further aspects, system 142 may adjust the size of geographic buffer zone 384 and the location of virtual boundary 384A based on, among other things, changes in the monitored geographic locations of client device 112 and triggering devices 122 and 132 and/or changes in the speeds at which client device 112 and triggering devices 122 and 132 travel within geographic region 380. In other instances, system 142 may adjust the size of geographic buffer zone 384 and the location of virtual boundary 384A to account for changes in traffic or weather conditions, police and/or fire department activity, and any additional or alternate parameter that may be monitored by system 142 and that impacts a time required by client device 112 and triggering devices 122 and 132 to reach target location 382.

For instance, as a displacement between client device 112 and target location 382 increases, and additionally or alternatively, as a displacement between triggering device 122 and target location 382 decreases, system 142 may adaptively compute the position of virtual boundary 384A within geographic region 380 to account for the changes in travel time and ensure that user 110 may nonetheless arrive at target location 382 prior to triggering entity 120. Further, by way of example, system 142 may adaptively modify the virtual boundary 384A in response to changes in traffic conditions (e.g., increases in traffic during rush hour), and/or police activity that would impact an ability of either triggering device 122 or user device 112 to be transported through geographic region 380.

Figure 3C:
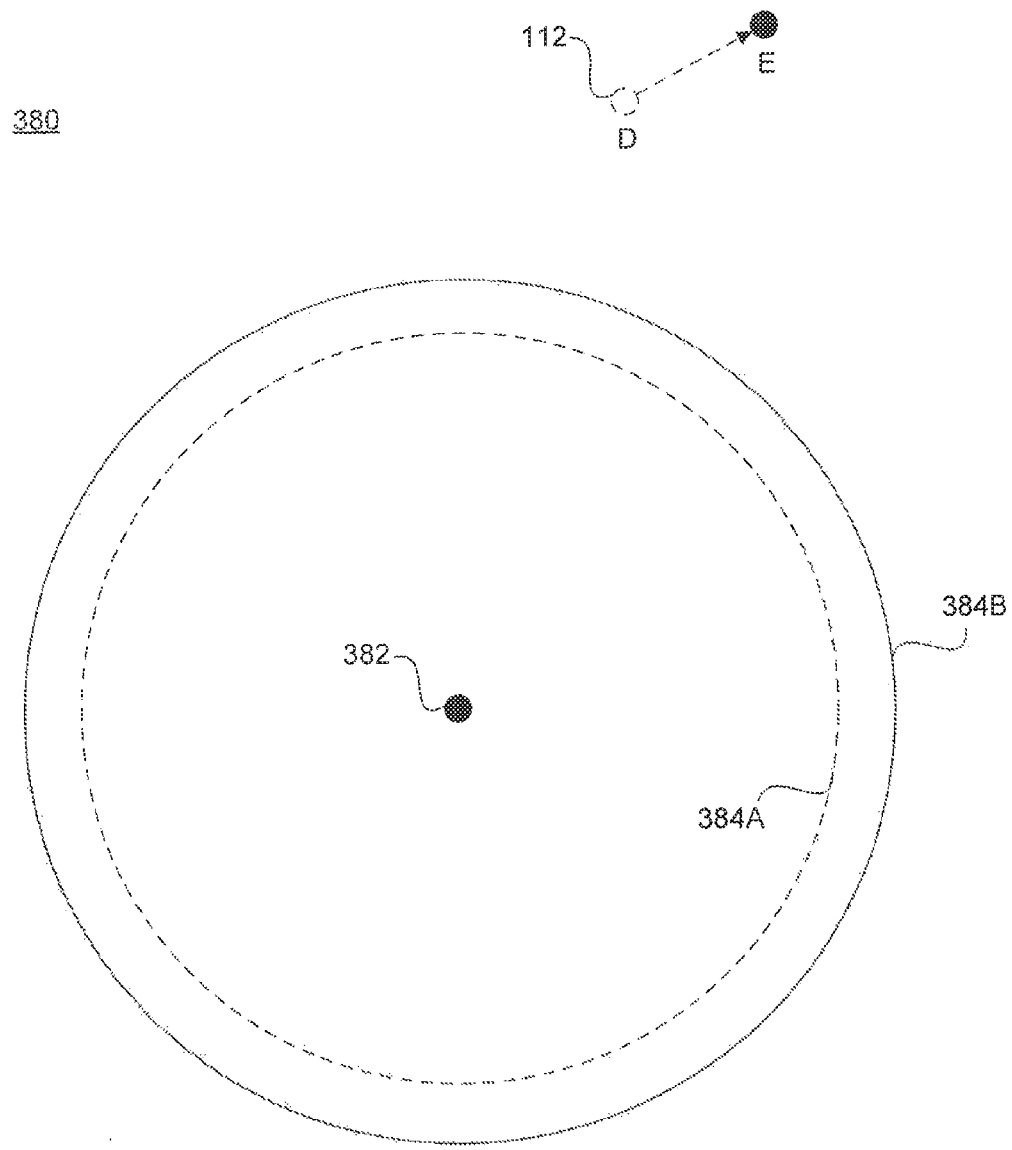

By way of example, and as illustrated in FIG. 3C, system 142 may detect that a geographic location of triggering device 122 moves within geographic region 380 from location "A" to location "B" and further, that a geographic location of client device 112 moves within geographic region from location "D" to location "E." In some aspects, system 142 may be configured to determine that a displacement between location "E" and target location 382 may exceed a corresponding displacement between location "B" and the target location. Further, based on the relative movement of devices 112 and 122, system 142 may determine that, based on current travel conditions (e.g., traffic conditions, weather conditions, emergency activity, relative speeds of devices 112 and 122, etc.), triggering device 122 may reach target location 382 prior to user device 112's arrival at target location 382. In some embodiments, system 142 may be configured expand prior virtual boundary 384A and compute a modified virtual boundary 384B that reflects the movement of client device 112 and triggering device 122 and ensures that user 110 arrives at target location 382 prior to triggering entity 120.

Figure 3D:
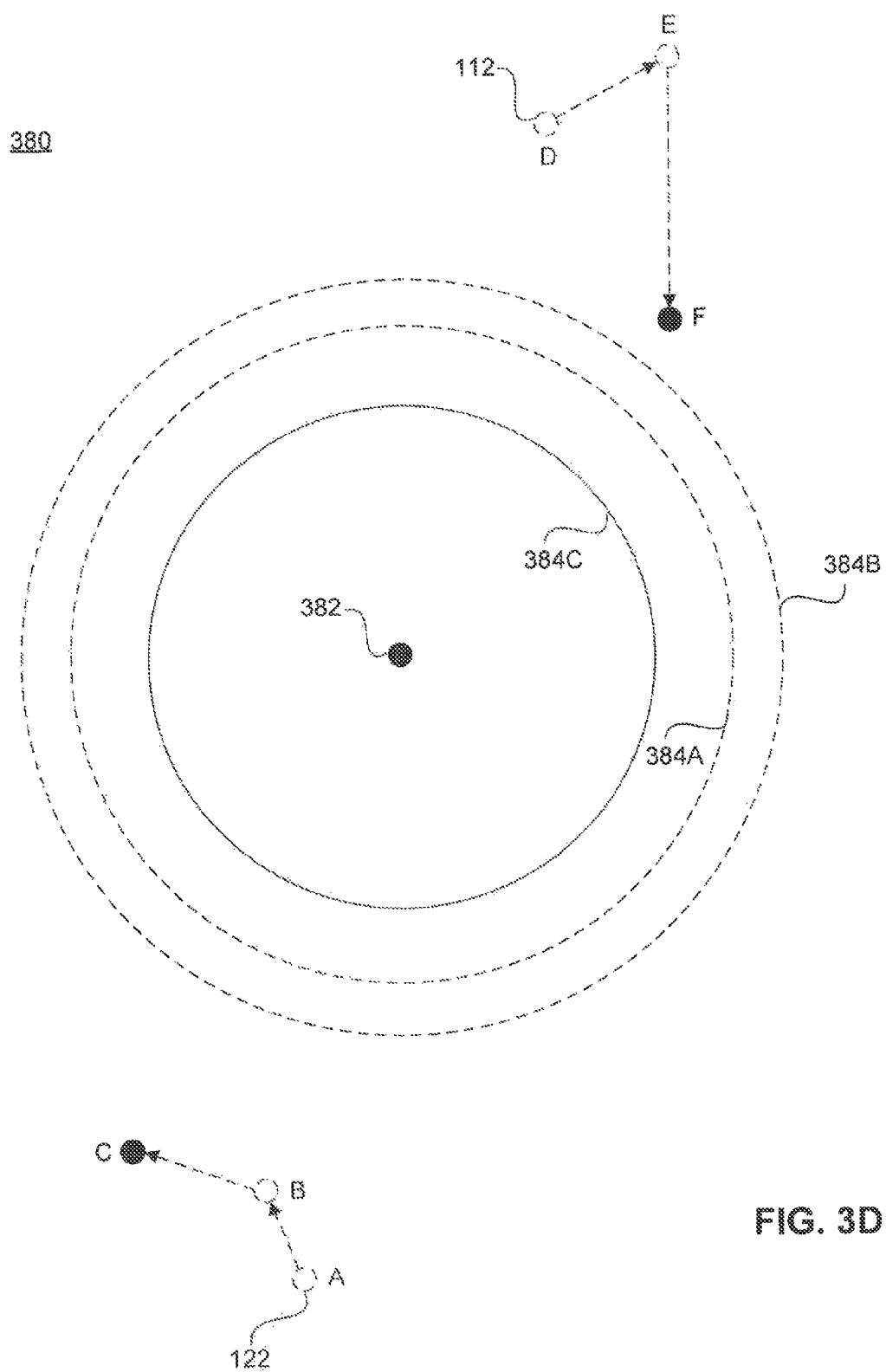

As described above, system 142 may continue to monitor the relative geographic location, speed, and/or travel direction of client device 112 and triggering device 122 within geographic region 380 (e.g., based on positional data received from corresponding GPS sensors incorporated into client device 112 and triggering device 122). For example, as depicted in FIG. 3D, system 142 may detect that a geographic location of triggering device 122 continues to move within geographic region 380 from location "B" to location "C" and further, that a geographic location of client device 112 moves within geographic region from location "E" to location "F." Further, system 142 may be configured to determine that a displacement between location "C" and target location 382 may exceed a corresponding displacement between location "F" and target location 382. Based on the continued movement of devices 112 and 122, system 142 may be configured to compute a modified virtual boundary 384B that, although representing a contraction of prior virtual boundary 384B, nonetheless ensures that user 110 arrives at target location 382 prior to triggering entity 120.

As described above system 142 may continue to monitor the relative geographic location, speed, and/or travel direction of client device 112 and triggering device 122 within geographic region 380. At regular intervals, or in response to substantial changes in location, speed, or direction (e.g., that exceed corresponding thresholds), system 142 may be configured to compute additional virtual boundaries that ensures that user 110 arrives at target location 382 prior to triggering entity 120. Further, although depicted as concentric circles disposed about target location 382 in FIGS. 3A, 3B, and 3B, the disclosed embodiments are not limited to these exemplary boundaries, and in further embodiments, system 142 may be configured to compute any regular and/or irregular boundary appropriate to geographic region 380. Moreover, although described in terms of a single client device (e.g., client device 112) and a single triggering device (e.g., triggering device 122), the disclosed embodiments are not limited to these exemplary numbers and types of devices, and in other embodiments, system 142 may be configured to monitor relative geographic locations, speeds, and/or travel directions of any additional or alternate number of client devices and/or triggering devices operable with system 140.

In some aspects, the received boundary creation request may represent a user's request to be notified when systems and/or devices associated with a triggering entity (e.g., triggering entity 120 and/or 130) intersect virtual boundary 384 in geographic region 380. As described above, the size, shape, and/or extent of the boundary may depend on any factor consistent with the disclosed embodiments. In one example, for instance, a boundary creation request may reflect a user's desire to be notified when a system (e.g., a triggering device associated with, for example, a cable company, pizza delivery service, courier, etc.), intersects a particular geographical boundary with characteristics determined by system 142 (e.g., virtual boundary 384A). In this example, by notifying user 110 when a cable company service vehicle, a pizza delivery car, and/or a shipping truck intersections virtual boundary 384A, user 110 may be able to travel from a current geographic location to target location before the cable company service vehicle, the pizza delivery car, and/or the shipping truck traverses the distance between virtual boundary 384A and target location 384.

Referring back to FIG. 3A, in some embodiments, the boundary creation request received in step 302 may comprise information that indicates a type of input delivered over communications network 125, such as an e-mail, and SMS text message, input provided over a website hosted on system 142, input provided to a mobile application running a client device (e.g., client device 112), and the like. In certain aspects, the boundary creation request may also include information that specifies one or more devices (e.g., one or more triggering devices) to be tracked and monitored by system 142, although such information is not required.

In certain embodiments, system 142 may be configured to determine one or more boundary extent parameters (e.g., in step 304). In some embodiments, system 142 may be configured to determine boundary extent parameters that include information relevant to a boundary creation request. In certain aspects, information may be relevant to a boundary creation request when it may influence how system 142 calculates, processes, and/or determines the characteristics (e.g., the size, shape, etc.) of the virtual boundaries associated with the boundary creation request. In certain aspects, the boundary extent parameter(s) may include information associated with one or more triggering devices (e.g., triggering devices 122 and 132). In some embodiments, for instance, the boundary extent parameters may reflect information informing system 142 of an expected arrival time of one or more of the triggering devices at a location (or locations) specified in the boundary creation request. For example, in some aspects, boundary extent parameters may include a location of one or more of the triggering devices, a speed of one or more of the triggering devices, a direction of travel of one or more of the triggering devices, and the like (e.g., elevation, acceleration, etc.).

In some aspects, the boundary extent parameters may include other information potentially affecting an expected arrival time of a triggering device at a destination location associated with the request. For example, in one embodiment, the boundary extent parameters may include traffic information reflecting current, expected, or predicted traffic conditions between a triggering device and its destination location or other localities (e.g., known traveling routes). In certain aspects, traffic information may include any other type of information reflecting expected traffic conditions, such as current or expected weather patterns, etc.

In another embodiment, the boundary extent parameters may include priority information reflecting an expected, calculated, or known latency period associated with one or more of the triggering devices. In certain aspects, the latency period may represent a time period in which the triggering device will not be traveling en route to the location. For example, system 142 may be configured to determine whether a triggering device may be stopped at a particular locality (e.g., service stations, other user locations, break stations, etc.) or otherwise not en route to a destination location (e.g., due to known delivery or service schedules, expected breaks, etc.), and incorporate this information into the latency boundary extent parameter. As described above, system 142 may be compute current and ongoing times required for the triggering device to travel from a current geographic location to a target location established by system 142 in response to a request from user 110. In some aspects, system 142 may be configured to maintain a previously computed travel time for the triggering device during any latency period, and to compute and updated travel time, and further, updated positions of the virtual boundary (e.g., virtual boundary 384A of FIG. 3B) upon expiration of the latency period.

In another example, the boundary extent parameters may include a modified time parameter reflecting a desired duration of time that a user, notification entity 140, and/or triggering entity may wish to add, insert, and/or subtract from an expected arrival time at a destination route. For example, a user may wish to subtract a certain duration of time from the expected arrival time to ensure he or she is at the location before the triggering device arrives (e.g., a triggering device located on a courier truck, pizza delivery car, cable company van, a person, etc.).

In other aspects, the modified time parameter may reflect an amount of time required by user 110 and/or the one or more triggering entities to prepare for an event associated with the expected arrival time. For example, if a cable company van were scheduled to arrive at the user 110's home at 5:30 p.m., user 110 may wish to arrive home at 5:15 p.m. to ensure fifteen minutes of preparation time prior to the arrival of the cable van (e.g., to clean an area of the home in which the cable box is disposed). In one instance, user 110 may specify, as input to an interface rendered for presentation by client device 112, a modified time parameter of fifteen minutes to reflect the desired preparation time, which client device 112 may provide to system 142. In some embodiments, system 142 may determine a modified expected arrival time of 5:15 p.m. (e.g., as a boundary extent parameter in set 304), which reflects the desired fifteen minute preparation time in advance of the 5:30 p.m. arrival time, and may provide notifications and other proximity-detection processes consistent with the disclosed embodiments and in accordance with the modified expected arrival time.

In other aspects, the expected arrival time may reflect a scheduled appointment time of one or more individuals at a specified location. For example, user 110 may be an employee of a financial institution (e.g., a loan officer, a financial advisor, etc.), who may expect an arrival of one or more customers (e.g., triggering entity 122 and/or 132) at a branch of the financial institution for a previously scheduled appointment at 10:00 a.m. on a particular day. Due to the nature and subject matter of the appointment, user 110 (e.g., the employee) may anticipate that thirty minutes will be required to adequately understand the subject matter and prepare for the appointment. In certain instances, user 110 may specify, as input to an interface rendered for presentation by client device 112, a modified time parameter of thirty minutes to reflect the desired preparation time, which client device 112 may provide to system 142.

As described above, system 142 may determine a modified expected arrival time of 9:30 a.m. to reflect the desired preparation time (e.g., as a boundary extent parameter in set 304), and system 142 may provide notifications and other proximity-detection processes consistent with the disclosed embodiments and in accordance with the modified expected arrival time. For example, and as described below, system 142 may provide a notification to client device 112 indicating that user 110 should travel back to the location of the appointment in order to arrive by 9:30 a.m. which will afford the anticipated 30 minutes of preparation time before the arrival of the customer.

In other instances, system 140 may enable user 110 to specify a default modified time parameter (e.g., indicative of preparation time, etc.) for one or more types of events (e.g., client appointments, employee appointments, service calls, etc.) as an input to a corresponding interface rendered for presentation by client device 112. For example, user 110 may specify, as input to client device 112, a first default modified time parameter of fifteen minutes to reflect preparation time for employee appointments and a second default modified time parameter of thirty minutes to reflect preparation time for client appointments. In some aspects, system 142 may receive the default modified time parameters from client device 112, and store the default modified time parameters in a portion of data repository 144. Further, and as described above, system 142 may apply corresponding ones of the default modified time parameters to the appropriate events and compute modified expected arrival times that enable user 110 to arrive at corresponding locations with sufficient time to prepare for the corresponding events (e.g., client appointments, employee appointments, service calls, etc.).

In further aspects, boundary extent parameters consistent with the disclosed embodiments may include parameters identifying additional or alternate prerequisites for an event or appointment, and further, one or more technological or data requirements for the event or appointment. For example, user 110 may, in submitting a boundary creation request for a scheduled group meeting having multiple participants, specify (e.g., as input to an interface presented by client device 112) additional parameters indicating that the appointment requires access to desktop, laptop, and/or other computing device capable of accessing a presentation device (e.g., a projector, LCD screen, etc.). In other instances, the boundary creation request may be associated with a scheduled client appointment that requires specific legal documents, which may be identified by user 110 as a parameter provided to client device 112, as described above. In additional instances, the subject matter associated with a scheduled appointment may require various human resources, such as a particular employee or other representative of a business (e.g., the financial institution) and additionally or alternatively, employees and/or representatives that possess specific governmental and/or professional certifications (e.g., a certification as a financial advisor, a license to trade securities, a bar license, etc.). In certain aspects, the disclosed embodiments may enable user 110 to specify the required governmental and/or professional certifications as parameters to parameters provided to client device 112, as described above.

As another example, the boundary extent parameters may include a limit parameter reflecting an absolute distance or time period associated with a geographical region. For example, in one aspect, a boundary extent parameter may represent a boundary associated with a particular distance (e.g., 10 miles) or time (e.g., 15 minutes) distance away from the destination location. In certain embodiments, the limit parameter may be one component of additional boundary extent parameters (e.g., establishing a maximum or minimum boundary region distance or time). In other embodiments, the limit parameter may reflect a request to be notified when one or more triggering devices is a set distance or expected time period away from the destination location or some other point of interest (e.g., the edge of a boundary).

In some aspects, the boundary extent conditions may also incorporate usage parameters reflecting a relationship between the triggering devices and the boundary creation request. For example, the boundary extent parameters may include a usage parameter reflecting whether a particular device is associated with a user (e.g., the device is user-associated), whether a particular triggering device corresponds to a particular location, boundary, and/or boundary request (e.g., for embodiments with multiple triggering devices and/or destination locations, etc.), and similar identifying information.

In certain aspects, system 142 may be configured to monitor one or more triggering devices to obtain, process, and track information associated with the determined boundary extent parameters to perform processes consistent with the disclosed embodiments (e.g., in step 306). For example, system 142 may be configured to obtain information from the triggering devices reflecting their location, speed, direction, elevation, etc., in order to respond to the boundary creation request (e.g., calculate the expected arrival times of one or more triggering devices).

In certain embodiments, system 142 may obtain additional information related to the boundary extent parameters from other computing or data processing systems. For example, in one embodiment, system 142 may be configured to store, receive, or obtain information related to traffic conditions (e.g., from systems configured to track traffic conditions), expected latency times, priority information (e.g., known schedules), and/or modified time parameters (e.g., as received from a client device, generated by the system, etc.). In another example, system 142 may be configured to obtain, gather, and process information associated with the boundary extent parameters (e.g., a location of a triggering device) from systems associated with social networking computing systems (e.g., social networking sites). In some aspects, system 142 may be configured to obtain information related to the boundary extent parameters over one or more communications networks (e.g., network 125).

In some embodiments, system 142 may be configured to calculate boundary extents of a proximity boundary about a destination location (e.g., in step 308). In some aspects, a boundary extent may delimit the geographical area(s) of a boundary associated with an expected arrival time of one or more triggering devices at the destination location. For example, in one illustrative aspect, system 142 may be configured to obtain information related to a location and speed of a triggering device, traffic conditions, etc., and determine an expected arrival time of the triggering device based on this boundary extent information. In certain aspects, system 142 may be configured to convert this expected arrival time into a boundary extent reflecting the geographical boundaries to which a user may travel (e.g., by car, by foot, etc.) before the triggering device would be expected to arrive at the destination location before the user. System 142 may be configured to calculate, generate, and adaptively modify any calculated boundary extents through performing processes consistent with the disclosed embodiments (e.g., embodiments disclosed in connection with FIGS. 4 and 6A-6E).

In certain aspects, system 142 may be configured to determine whether the boundary extents have been crossed (e.g., a triggering device is located within the boundary extents) (e.g., in step 310). For example, system 142 may be configured to determine the extents of all the boundaries associated with a particular boundary creation request and/or location, and determine if one or more of the triggering devices are located within the geographical area subtended by the determined boundaries. In certain embodiments, if system 142 determines that none of the triggering devices are located within the geographical extent (e.g., step 312; No), the system may be configured to continue to monitor the triggering devices (e.g., in step 306). In some embodiments, if system 142 determines that one or more of the triggering devices are located within the boundary extent (e.g., step 312; Yes), the system may be configured to perform processes consistent with the disclosed embodiments.

In some aspects, system 142 may be configured to perform additional or alternative processes to determine whether a triggering device has effectively crossed (e.g., is located in) a boundary extent. For instance, in certain aspects in which one or more of the triggering devices may be associated with a user, system 142 may be configured to remove, exempt, or otherwise account for the user-associated triggering devices in its calculation (e.g., to avoid notifying a user merely because the user resides within the boundary extent).

As another example, system 142 may be configured to incorporate other boundary extent information into its determination. For example, in one embodiment, system 142 may be configured to obtain priority information relating a triggering device located within the boundary extents. In certain aspects, system 142 may account for the latency period associated with the priority information when determining whether the associated triggering device has effectively crossed the boundary extent. For example, system 142 may determine, based on prior calculations of travel speed, directions, etc., that one of three monitored triggering devices is located within a boundary extent. The triggering device may, however, be associated with a latency period of three hours, and system 142 may delay the generation and transmission of proximity notification to one or more client device until expiration of the latency period. In other aspects, system 142 may incorporate such information directly into its boundary extent calculation consistent with the disclosed embodiments.

In some aspects, system 142 may be configured to send a proximity notification to one or more client devices upon determining that one or more triggering devices have crossed a boundary extent (e.g., in step 314). In certain embodiments, the proximity notification may take any form consistent with the disclosed embodiments such as an e-mail, SMS text message, telephone message, pop notification, application notification (e.g., delivered to a mobile application running on the client device), or any other type of notice providing information to a client device. In some embodiments, one or more of the client devices receiving the proximity notification may be associated with a computing system or user who originated the boundary creation request, but such as relationship is not required. For example, in one aspect, system 142 may be configured to send a proximity notification to a client device associated with a third party and not the user originating the boundary creation request.

The proximity notification may include any information consistent with the disclosed embodiments (e.g., approximate time to arrival, location information, other information associated with a triggering device such as the triggering entity, a driver or other personnel associated with the triggering device or entity, and so on). In some embodiments, system 142 may account for other information before sending a proximity notification. For example, system 142 may determine that at least one of the triggering devices located within a boundary extent is associated with user 110. In certain aspects, system 142 may modify one or more of the exemplary notification processes to reflect the association of the at least one triggering device with user 110 (e.g., by determining not to send a notification when only a triggering device associated with user 110 is located within the boundary extent).

Figure 4:
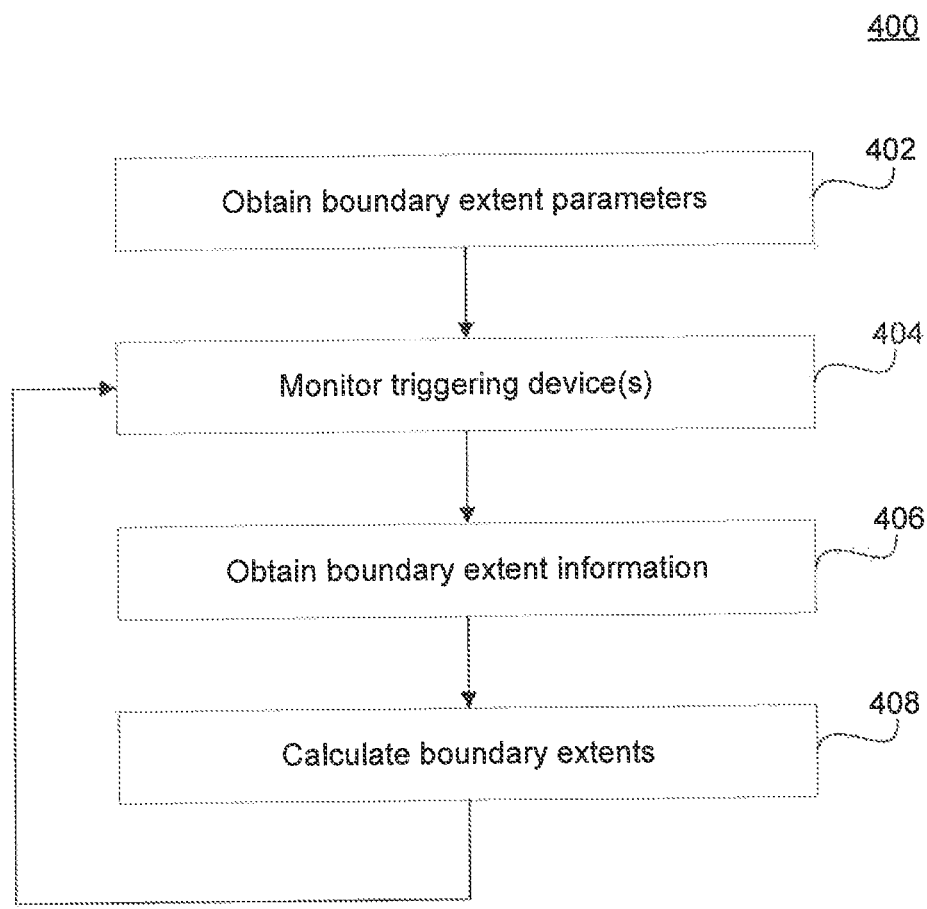
FIG. 4 depicts a flowchart for an exemplary boundary extent calculation process consistent with the disclosed embodiments.

FIG. 4 depicts a flowchart for an exemplary boundary extent calculation process 400 consistent with the disclosed embodiments. In some aspects, system 142 may be configured to determine and obtain one or more boundary extent parameters associated with a boundary creation request consistent with the disclosed embodiments (e.g., consistent with FIG. 3) (e.g., in step 402). In certain aspects, system 142 may be configured to monitor one or more triggering devices for information associated with the one or more boundary extents (e.g., boundary extent information), and obtain the boundary extent information consistent with the disclosed embodiments (e.g., consistent with FIG. 3) (e.g., in steps 404 and 406). System 142 may also be configured to obtain boundary extent information from other computing systems (e.g., systems associated with a social network, traffic monitoring service, weather service, etc.).

In some embodiments, system 142 may be configured to calculate boundary extents of a proximity boundary about one or more destination locations based in part on the boundary extent information (e.g., in step 408). In some aspects, a boundary extent may delimit the geographical area(s) of a boundary associated with an expected arrival time of one or more triggering devices at the destination location. System 142 may be configured to calculate an expected arrival time of a triggering device by performing any of the processes consistent with the disclosed embodiments. In some aspects, system 142 may be configured to continually monitor the one or more triggering devices providing boundary extent information in order to dynamically update and refresh the calculated boundaries of a boundary extent (e.g., in step 404).

In certain aspects, system 142 may be configured to calculate boundary extents for a single boundary by determining the expected arrival time of a single triggering device relevant to the boundary creation request at a destination location. System 142 may determine the characteristics of the boundary extents (e.g., the size, shape, range, etc.) based in part on information obtained from the triggering device, as well as other boundary extent information (e.g., information relating to lead times or priority parameters provided by a user or obtained from a third-party system, etc.).

In other aspects, system 142 may be configured to calculate one or more boundary extents by merging information from two or more triggering devices (e.g., a single boundary represents two or more triggering devices), by calculating a separate boundary for each monitored triggering device, by calculating one or more boundaries for only some triggering devices and not others, by calculating extents for more than one destination location, etc. System 142 may calculate the boundary extent using any information consistent with the disclosed embodiments (e.g., boundary extent information, other information obtained from system 142, etc.). For example, in one aspect, a user may provide information to system 142 comprising a modified time parameter reflecting a 10-minute lead-time by which the user desires to arrive before a triggering device. System 142 may be configured to implement other processes, such as assigning different weights to some or all of the boundary extent parameters (e.g., weight a device's speed over weather conditions, incorporate both into a predicted arrival time, etc.), and/or to some or all of the triggering devices (e.g., the arrival of one of the triggering devices is more or less important than the arrival of others, etc.).

In certain embodiments, system 142 may receive input from a client device (e.g., client device 112) directing system 142 to compute travel times and associated boundary extents such that the user will arrive at the destination before a specified one of a plurality of triggering devices (e.g., triggering device 122 or 132). In some aspects, system 142 may be configured to distinguish among the triggering devices it monitors to perform processes consistent with the disclosed embodiments. For example, in one aspect, system 142 may be configured to determine a difference in expected arrival times between the specified triggering device and other monitored triggering devices. In this example, system 142 may be configured to calculate boundary extents reflecting the geographical boundaries to which a user may travel to guarantee that the user arrives at the destination location before the specified triggering device. For example, the user may be traveling to a surprise birthday party for a triggering entity associated with the specified triggering device, and the user may, through the client device, provide instructions to enable system 142 to monitor and adjust boundaries based on the specified triggering device. System 142 may be configured to calculate the boundary extent using any information consistent with the disclosed embodiments (e.g., boundary extent information from the user-associated device such as location, speed, direction, information associated with the other triggering devices, other information obtained from system 142, etc.).

For example, a user may provide, through a web page, online portal, or interface presented by a client device, input specifying a boundary creation request to ensure that she is at a destination location (e.g., her home) before a cable company serviceman and package courier arrives at the user's home in accordance with predetermined scheduled meetings. The client device may, in some aspects, generate the boundary creation request based on the provided input, and transmit the generated request to system 142 using one or more of the communications protocols outlined above, In response to the received boundary creation request, system 142 may be configured to monitor one or more triggering devices associated with the cable company and the package courier to determine when the systems will arrive at her home. In certain embodiments, system 142 may be configured to convert these expected arrival times, and subtract them from an expected arrival time associated with the user-associated triggering device (e.g., her smartphone), thereby defining the geographical limits to which she may travel before she must return home.

Figure 5:
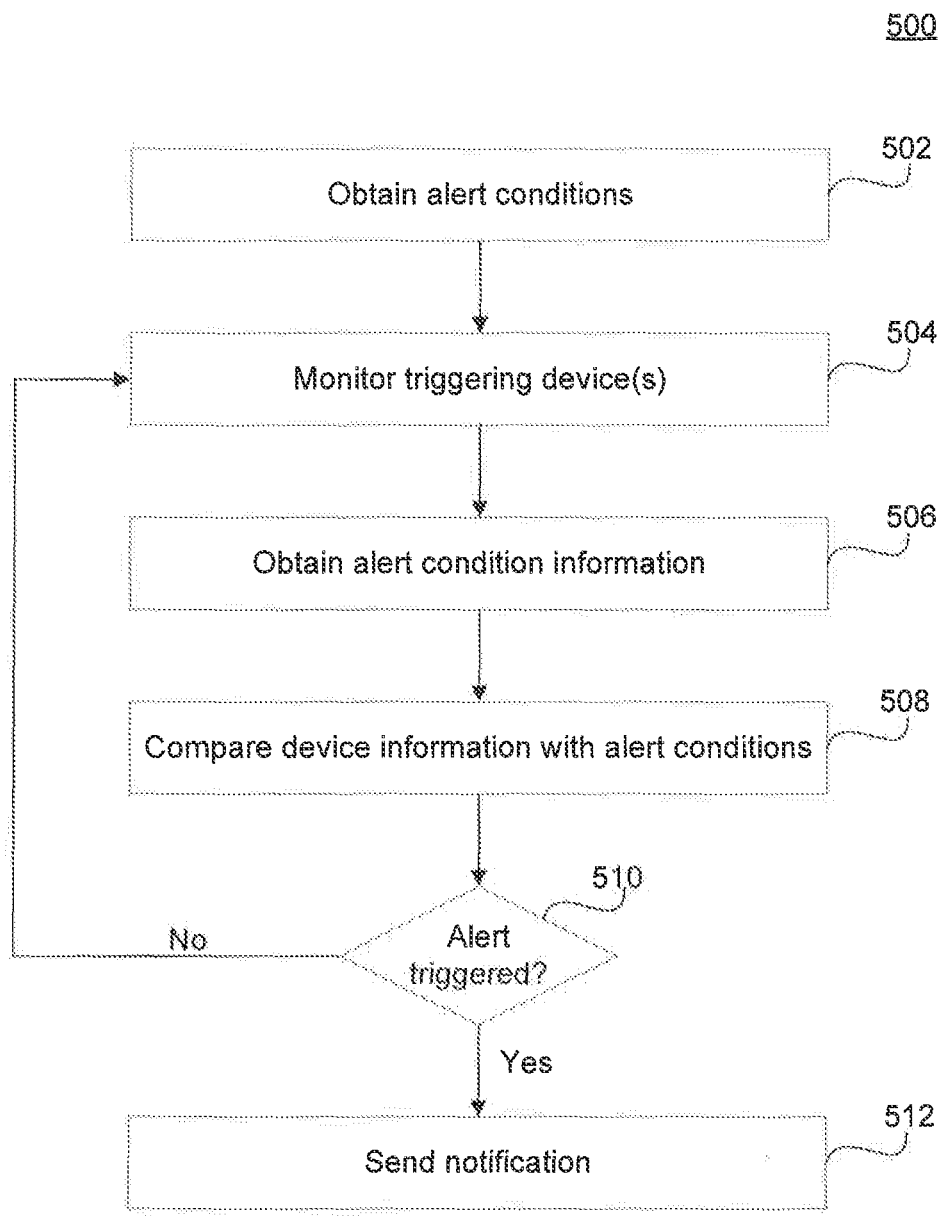
FIG. 5 depicts a flowchart for an exemplary alert notification process consistent with the disclosed embodiments.

In some embodiments, system 142 may be configured to provide notifications to one or more client devices in the absence of a triggering device crossing a boundary extent. For example, FIG. 5 depicts a flowchart for an exemplary alert notification process 500 consistent with the disclosed embodiments. In some aspects, system 142 may be configured to obtain one or more alert conditions associated with a boundary creation request (e.g., in step 502). In certain embodiments, an alert condition may specify a circumstance under which system 142 may provide a notification to one or more client devices. In certain aspects, an alert condition may comprise a situation in which a triggering device crosses a boundary extent consistent with the disclosed embodiments (e.g., the embodiments described in connection with FIG. 3).

In some embodiments, an alert condition may also specify other circumstances under which system 142 may be configured to provide a notification to a client device. For example, in one aspect, an alert condition may comprise a boundary distance condition reflecting a predefined, variable, and/or maximum distance a triggering device may be from a destination location or edge of a boundary extent. In one illustrative embodiment, system 142 may be configured to send a notification to a client device when a triggering device (e.g., a user-associated triggering device, another device, etc.) is a predefined distance away (e.g., 20 miles) from the destination location or boundary extent. In another example, an alert condition may also reflect a predefined or established time period or point in time. In certain aspects, the time period may be a relative to some other time period or condition (e.g., 5 minutes before 3:00 p.m., 10 minutes after a meeting, 20 minutes from now, 15 minutes before a transmitting device is expected to cross a boundary extent, and similar conditions, etc.). In other aspects, the time period may be absolute (e.g., 2:45 a.m.).

In certain aspects, system 142 may be configured to assess multiple alert conditions before providing a notification to a client device. For example, in one aspect, system 142 may be configured to provide a notification to a client device at a particular time (e.g., 2:55) only if there are no triggering devices (or only user-associated triggering devices, only specified triggering devices, etc.) within the boundary extent. In another example, system 142 may be configured to provide a notification to a client device if a triggering device is a certain distance away from the destination location (e.g., 30 miles) only if there are no triggering devices (or only user-associated triggering devices, only specified triggering devices, etc.) within the boundary extent. As another example, system 142 may be configured to provide a notification to a user device when a triggering device associated with another entity is running late (e.g., is not located within a certain boundary extent at a particular time, is a certain threshold distance away from a destination location, etc.), and alert the user accordingly.

In some embodiments, system 142 may be configured to monitor one or more triggering devices to obtain, process, and track information associated with the determined boundary extent parameters to perform processes consistent with the disclosed embodiments (e.g., consistent with the embodiments described in connection with FIG. 3) (e.g., in steps 504 and 506). For example, system 142 may be configured to obtain information from the triggering devices reflecting their location, speed, direction, elevation, and any other information consistent with boundary extent information or the one or more alert conditions. In some aspects, system 142 may incorporate additional information consistent with the disclosed embodiments (e.g., information stored on other computing systems, information derived from the obtained device information, etc.). For example, in some aspects, system 142 may be configured to obtain, generate, or receive information reflecting whether a triggering device is located within a boundary extent, whether a device is a user-associated device, whether a device is associated with a particular alert condition, and the like. In certain aspects, the information associated with the one or more alert conditions may be referred to as "alert condition information," but the use of such term is for illustrative purposes only and it not limiting.

In certain aspects, system 142 may be configured to compare the obtained alert condition information to the one or more alert conditions to determine if any of the conditions have been triggered (e.g., in step 508). For example, system 142 may be configured to determine if one or more of the triggering devices is a predefined distance and/or an expected duration of time away from a destination location, whether one or more of the triggering devices is located within a boundary extent, etc. In certain aspects, if system 142 determined that none of the alert conditions have been triggered (e.g., step 510; No), then system 142 may be configured to continue to monitor the triggering device(s) and other computer systems providing alert condition information (e.g., external computer systems) consistent with the disclosed embodiments (e.g., in step 504). In some embodiments, if system 142 determines that one or more of the alert conditions are satisfied (e.g., step 510; Yes), the system may be configured to perform processes consistent with the disclosed embodiments.

In some embodiments, system 142 may be configured to send an alert notification to one or more client devices upon determining that one or more alert conditions have been triggered. In certain embodiments, the alert notification may take any form consistent with the disclosed embodiments, such as an e-mail, SMS text message, telephone message, pop notification, application notification (e.g., delivered to a mobile application running on the client device), or any other type of notice providing information to a client device. The alert notification may include any information consistent with the disclosed embodiments (e.g., any information consistent with a proximity notification such as a time, place, location, etc.), including information associated with the alert conditions and/or alert condition information. In some aspects, system 142 may be configured to account for other information in determining whether to send an alert notification. For example, in some aspects, system 142 may be configured to determine whether it has already sent a proximity notification or another alert notification to a client device. In certain embodiments, system 142 may not send an alert notification if it has already sent a proximity detection or another alert notification (e.g., an alert notification concomitant with the alert at issue), but such determination is not required.

In certain aspects, system 142 may be configured to provide other kinds of information to user devices. In some embodiments, system 142 may be configured to provide information to one or ore client devices for use in processes of other computing systems. For example, in one exemplary aspect, system 142 may be configured to determine that a triggering device associated with another user will be late to a meeting or dinner occasion at a destination location (e.g., as specified by the time, and determined via processes consistent with the disclosed embodiments). In this example, system 142 may be configured to send coupons, offers, promotions, notices, or other information to one or more client devices associated with a boundary extent generated for the destination location (e.g., triggering devices determined to be friends with the late triggering device). FIGS. 6A-6E depicts exemplary boundary extent configurations consistent with the disclosed embodiments. The representations in FIGS. 6A-6E may be associated with information generated and stored by system 142, and may be used to perform one or more of the processes disclosed herein. In other aspects, the disclosed embodiments may use the information to generate a graphical representation reflecting the exemplary boundary extent configurations (and others) that may be displayed in a graphical form (or text form) in a display device.

For example, FIG. 6A depicts an exemplary boundary extent configuration in which system 142 has calculated a boundary extent 612 around a single destination location 602. System 142 may be configured to calculate boundary extent 612 by performing processes consistent with the disclosed embodiments (e.g., consistent with the embodiments disclosed in connection with FIGS. 3 and 4). In certain aspects, system 142 may be configured to calculate boundary extent 612 based in part on one or more boundary extent parameters consistent with the disclosed embodiments. In some aspects, system 142 may determine the extents, form, shape, range, etc. of boundary extent 612 based in part on information obtained from or associated with triggering device 622. For example, in one embodiment, system 142 may be configured to calculate boundary extent 612 based on a location, speed, direction, traffic conditions surrounding, and/or expected latency times associated with triggering device 622.

FIGS. 6B and 6C depict exemplary configurations where system 142 calculates a single boundary extent 612 associated with destination location 602. In these examples, system 142 may be configured to calculate boundary extent 612 based in part on information from two triggering devices 622 and 624. In certain aspects, for instance, system 142 may determine the bounds of boundary extent 612 based on the speed, location, movement, etc., of triggering devices 622 and 624. In some aspects, one of triggering devices 622 and 624 may include a user-associated triggering device. In certain embodiments, system 142 may be configured to determine the triggering devices that are user-associated, and account for this information in its calculation of the boundary extent, consistent with the disclosed embodiments.

FIG. 6D depicts an exemplary configuration in which system 142 calculates two boundary extents 612 and 614 associated with a single destination location 602. In this example, system 142 calculates the configuration of the boundary extents from three triggering devices 622, 624, and 626. In certain aspects, system 142 may associate the triggering devices to one of the boundary extents 612 and 614. For example, system 142 may calculate boundary extent 612 based in part from information associated with (e.g., boundary extent information) triggering devices 622 and 626, and similarly may calculate boundary extent 614 based in part from information associated with triggering device 624. In another aspect, system 142 may associate one or more of the triggering devices (e.g., devices 622, 624, and 626) with any number of boundary extents. For example, in one illustrative aspect, system 142 may calculate boundary extents 612 and 614 based in part from information associated with triggering device 622. In these embodiments, system 142 may be configured to determine boundary extents from any relevant triggering devices, even those associated with other boundary extents.

FIG. 6E depicts an exemplary configuration in which system 142 calculates two boundary extents 612 and 614 associated with a two destination locations 602 and 604. In this example, system 142 may be configured to associate boundary extent 612 with destination location 602, and boundary extent 614 with destination location 604. System 142 may be configured to determine the characteristics of the boundary extents by performing processes consistent with the disclosed embodiments. For example, system 142 may be configured to calculate the characteristics of boundary extents 612 and 614 based on information associated with triggering devices 622 and 624, respectively. In other aspects (e.g., aspects consistent with FIG. 6D), system 142 may be configured to determine the extents of a boundary (e.g., boundary 612) from information associated with any triggering device, such as both triggering devices 622 and 624. The disclosed embodiments include other combinations, permutations, extrapolations, and configurations, and the depiction of certain configurations is for illustrative purposes only, and is not limiting.

While the one or more boundary extents described in connection with FIGS. 6A-6F are depicted as circular regions, boundary extents consistent with the disclosed embodiments by take any shape, form, configuration, size, and/or asymmetry. For example, system 142 may calculate a boundary extent based on traffic conditions reflected in a traffic condition boundary extent parameter. In this example, it may be the case that traffic is heavier in particular regions or directions over others, and thus system 142 will calculate a non-uniform boundary extent. Other examples are possible (e.g., due to road design, speed limits on surrounding roads, accidents, information obtained from triggered devices, etc.), and the boundary extent may take any shape or size consistent with the disclosed embodiments.

As described above, the disclosed embodiments may enable a user (e.g., user 110) to enter into a notification arrangement with a triggering entity (e.g., triggering entity 120) such that a computerized system (e.g., system 142) provides a notification to a client device of user 110 (e.g., client device 112) that a device of a triggering entity (e.g., triggering device 122) intersects a virtual boundary established about a target location within a geographic region. In some instances, the virtual boundary may be adjusted based on relative speeds and positions of user 110 and triggering entity 120, local traffic conditions, police activity, and/or other events capable of impacting a travel within the geographic region. Further, by way of example, user 110 may, upon receipt of the notification by client device 112, travel from a current position to the specific position and arrive at the target location prior to triggering entity 120.

In some embodiments, the disclosed systems and methods may enable user 110 to establish a home as the target location, and arrive back home from errands or lunch prior to a scheduled arrival or a repair crew or delivery truck. In other aspects, user 110 may await a client's arrival at an office location for a scheduled meeting. Just prior to the scheduled meeting, the client calls user 110 and lets user 110 know that he is stuck in a meeting and will arrive as soon as possible. The disclosed embodiments may enable user 110, through client device 112, to "freeze" the office location as the target location, and enter into a notification arrangement with the client such that system 142 provides a notification to user 110 when the client travels within an initial distance, e.g., three kilometers, of the target location. User 110 may, for example, leave the office and walk to a local bank branch, and based on local traffic and weather conditions, system 142 may adaptively modify a virtual boundary about the target location to ensure that user 110 will be able to travel back to office and arrive prior to the client. Upon presentation of the notification by client device 112, user 110 may begin travelling back to his office, e.g., the target location, and will arrive prior to the client.

In further embodiments, user 110 may plan to meet a prospective investor at a local restaurant to talk business over lunch. A meeting scheduled immediate prior to lunch has been cancelled, but the restaurant does not open for another hour. In certain aspects, user 110 may, through client device 112, "freeze" the restaurant location as the target location, and enter into a notification arrangement with the investor such that system 142 provides a notification to client device 112 when the potential investor crosses a virtual boundary adaptively established by system 142 about the target location. Further, through a web page, online portal, or other interface presented by client device 112, user 110 may specify that the target location should be frozen for ninety minutes, and system 142 should compute the position of the virtual boundary such that user 110 arrives at the restaurant ten minutes before the client. User 110 may then proceed to walk to a local coffee shop and work until client device 112 receives a notification that the potential investor intersected the virtual boundary at which time user 110 travels back to the restaurant and arrives ten minutes before the potential investor.

In other aspects, user 110 may anticipate a meeting with a business unit leader, but may be unsure if the business unit leader is running late or not. User 110 may, for example, walk to the meeting location, and using client device 112, may "freeze" the meeting location as the target location, and enter into a notification arrangement with the business unit leader. Having established the notification arrangement, user 110 may continue working without interruption until client device 112 receives a notification from system 142 that the business unit leader is close to the meeting location. User 112 may then proceed to the meeting location.

Further, in additional aspects, user 110 may arrive at a restaurant for a scheduled dinner before his date. User 110, however, had no idea that the restaurant required a formal dress code, and user 110 finds himself underdressed. Since user 110 lives near the restaurant, user 110 may decide to travel home and change into more formal attire. As described above, user 110 may input data into client device 112 instructing system 142 to establish the restaurant as the target location, and initiate a notification arrangement with the date. User 110 may then travel home, change, and since client device 102 has not received any notification from system 142, stop at a flower shop to pick up flowers for the date.

In other instances, user 110 may arrange a surprise birthday party for a friend, and may be charged with ensuring the friend arrives at the party after all of the guests. In some aspects, user 110 may input information into client device 112 that establishes notification arrangements between user 110 and each invited guest. Upon arriving to pick up the friend, user 110 may also enter information into client device 102 that establishes the friend's home as the target location, and further, instructed system 142 to establish a virtual boundary about the target location with a small radius that enables user 110 to arrive five minutes after the last invited guest. System 142 may, for example, provide notifications to client device 112 of the arrival of each invited guest at the location of the party, and upon receiving the final notification on client device 102 (e.g., of the final invited guest's arrival), user 110 may then escort the friend to the surprise birthday party.

In further aspects, user 110 may schedule an initial appointment with a customer (e.g., triggering entity 120) for 9:00 a.m. at user 110's office (e.g., a target location). User 110 may be attending a breakfast meeting at an additional location separated from user 110's office by a ten-minute subway ride. In some aspects, user 110 may submit (e.g., through an interface presented by client device 112) a boundary creation request to system 142 that requests system 142 monitor the customer's mobile device (e.g., triggering device 122) and notify user 110 when the customer's location falls within twenty minutes of user 110's office. As described above, user 110 may also specify additional boundary extent parameters upon submission of the request, which include, but are not limited to, one or more meeting and/or location prerequisites and one or more data and technological requirements. In certain aspects, system 142 may receive the boundary creation request from client device 112, and may be configured to monitor the positions of client device 112 and triggering device 122 relative to each other and a virtual boundary established about the target location using any of the exemplary techniques outlined above.

For example, system 142 may detect that triggering device 122 intersects with the virtual boundary disposed about the target location, i.e., that the customer's current geographic location is twenty minutes away from user 110's office based on current traffic conditions. In certain aspects, and using any of the exemplary techniques described above, system 142 may generate and transmit a notification of the customer's current position to client device 112 (e.g., an e-mail, SMS text message, telephone message, pop notification, application notification, etc.), which client device 112 may render for presentation to user 110. User 110 may view the notification, leave the breakfast meeting, and plan to take the ten-minute subway ride to user 110's office and arrive ten minutes before the customer's expected arrival time.

User 110 may, however, determine that a mechanical breakdown disabled a portion of the subway line required to reach the office (e.g., based on data from one or more third-party systems connected to system 142 across network 125), and user 110 may determine to walk the distance back to user 110's office. In certain aspects, system 142 may continue to monitor the relative geographic location, speed, and travel direction of client device 112 and triggering device 122 (e.g., based on positional data received from corresponding GPS sensors incorporated into client device 112 and triggering device 122), and may determine that user 110 will likely arrive at the target location at 9:40 a.m., i.e., ten minutes after the arrival of the customer at the target location.

In an embodiment, system 142 may be configured to generate and transmit a notification to triggering device 122 (e.g., an e-mail, SMS text message, telephone message, pop notification, application notification, etc.) using any of the exemplary techniques described above (e.g., in reference to FIG. 5). For example, the generated notification may alert the customer to user 110's delay and further, may identify to the customer the expected arrival time of user 110 (e.g., 9:40 a.m.). Triggering device 122 may receive the transmitted notification, and render the received notification for presentation to the customer, e.g., through a corresponding interface. In some aspects, and upon receipt of the notification, the customer may slow a pace of travel and/or stop off at a local Starbucks™ for coffee with the confidential that he or she will arrive at the target location prior to or concurrently with user 110. In certain aspects, the exemplary notification processes outlined above may alert the customer to user 110's delay automatically and without intervention from user 110.

Although described above in terms of a single customer device (e.g., triggering device 122) associated with a single customer (e.g., triggering entity 120), and a single client device 112 associated with user 110, the disclosed embodiments are not limited to these exemplary numbers of devices and associated parties (e.g., triggering entities, users, and clients). In other aspects, the disclosed embodiments enable system 142 to monitor locations, speeds, and directions of travel of any additional or alternate client and/or triggering devices associated with any additional or alternate number of parties, determine whether the client and/or triggering device intersect one or more adaptively determined virtual boundaries about corresponding target locations, and further, generate and transmit notifications of the determined intersection to any of the client and/or triggering devices.

For example, in some aspects, the 9:30 a.m. appointment (e.g., a meeting) scheduled by user 110 may multiple include customers (e.g., having a business or familial relationship with each other) travelling to user 110's office from various locations and using various modes of transportation. In some embodiments, the multiple customers may be associated with one or more corresponding customer devices (e.g., multiple triggering devices 122 and 132), and system 142 may be configured to detect when at least one of the customer devices (e.g., at least one of triggering devices 122 or 132) intersect with a virtual boundary established by system 142. As described above, in response to the detected intersection, system 142 may be configured may generate and transmit a notification to client device 112, which client device 112 may render for presentation to user 110. Further, as described above, system 142 may determine that user 110 will likely arrive at the target location after the expected arrival times of the multiple customers, and system 142 may be configured to generate and transmit a notification to each of the customer devices (e.g., triggering devices 122 or 132) alerting the customers to user 110's delay and further, may identify to the customers the expected arrival time of user 110 (e.g., 9:40 am.).

Further, and as described above, system 142 may monitor current geographic locations, speeds, and directions of travel associated with devices held by various individuals and/or associated entities (e.g., user 110, and various human and non-triggering entities). As described above, system 142 may provide notifications to one or more customer devices (e.g., triggering devices 122 and/or 132) indicative of a delay associated with user 110's arrival at a meeting previously scheduled with one or more customers at user 110's office. In additional aspects, however, system 142 may determine that one or more of user 110's colleagues are also travelling to user 110's office, and are not impacted by the delay on the subway line. For example, system 142 may monitor a client device associated with a first colleague of user 110, and may determine based on the monitored geographic location, speed, and direction of travel of the first colleague's client device, that the first colleague is likely to arrive at user 110's office at 9:20 a.m., i.e., ten minutes prior to the scheduled meeting with the one or more customers.

In an embodiment, system 142 may be configured to determine whether the first colleague of user 110, who system 142 predicts will arrive at user 110's office ten minutes prior to the scheduled appointment, is capable of handling the appointment (e.g., the meeting) in place of user 110. For example, and as described above, user 110 may specify one or more one or more meeting prerequisites, location prerequisites, and/or data and technological requirements upon submission of a boundary creation request associated with the scheduled meeting (e.g., as input to an interface presented to user 110 by client device 112). In some aspects, system 142 may determine whether any of the specified meeting prerequisites, location prerequisites, and/or data and technological requirements would preclude system 142 from "handing-off" the scheduled meeting to the first colleague of user 110 in view of user 110's anticipated delayed arrival.

For example, the scheduled appointment may require copies of specific legal and financial documents, which may be stored electronically in one or more data repositories associated with a business entity that employs user 110 and the first colleague (e.g., a financial institution), and may thus be accessible to both user 110 and the first colleague. In other instances, user 110 may possess hard copies of all or a portion of the required legal and financial documents, which may not be accessible to the first colleague when user 110 is away from the office. Further, in some instances, the scheduled appointment may be associated with specific computational resources (e.g., computers capable of accessing projectors and/or LCD screen) and further, particular networking resources (e.g., secured networks associated with the financial institution). Additionally or alternatively, the subject matter of the appointment may be associated with and require specific human resources, such as a requirement that employees and/or representative of the financial institution conducting the appointment possess one or more governmental or professional certifications, as described above. The disclosed embodiments are, however, not limited to these exemplary meeting prerequisites, location prerequisites, and/or data and technological requirements, and in further aspects, scheduled meetings and events consistent with the disclosed embodiments may be associated with any additional or alternate prerequisite or requirement, including default prerequisites or requirements, appropriate to the subject matter of the scheduled appointment or meeting and the financial institution.

In an embodiments, system 142 may access information identifying the specified meeting prerequisites, location prerequisites, and/or data and technological requirements (e.g., as stored within a portion of data repository 146). Based on the accessed information, system 142 may determine whether a potential hand-off of the scheduled appointment (e.g., the meeting) from user 110 to the first colleague would be consistent with the specified meeting prerequisites, location prerequisites, and/or data and technological requirements.

If system 142 were to determine that the hand-off of the scheduled appointment (e.g., the meeting) from user 110 to the first colleague of user 110 would be consistent with the specified meeting prerequisites, location prerequisites, and/or data and technological requirements, system 142 may determine that the first colleague should handle the scheduled appointment in user 110's stead, and system 140 may be configured to generate notifications indicative of the hand-off, which may be transmitted to devices associated with user 110 (e.g., client device 112), the one or more customers (e.g., triggering devices 122 and 132), and the client device of the first colleague using any of the exemplary techniques described above. System 142 may, in some aspects, be configured to modify a portion of stored data (e.g., within data repository 146) associated with the boundary creation request to delete an association between the requested boundary creation and user 110, and establish and store (e.g., in data repository 146) an association between the requested boundary creation and the first colleague.

Alternatively, system 142 may determine that the proposed hand-off to the first colleague may be inconsistent with at least one of the specified meeting prerequisites, location prerequisites, and/or data and technological requirements. For example, user 110 may specify, when submitting the boundary creation request for the scheduled appointment, that the appointment requires a thirty-minute preparation period. In certain aspects, system 142 may determine that the proposed hand-off from user 110 to the first colleague is inconsistent with the specified meeting prerequisites, as system 142 predicts that the first colleague will arrive at user 110's office ten minutes prior to the scheduled appointment. Alternatively, system 142 may determine that the scheduled appointment requires documents in user 110's possession, or that the subject matter of the scheduled appointment indicates a professional certification that the first colleague lacks. In certain instances, and in response to these determinations, system 142 may determine that the proposed hand-off of the scheduled appointment to the first colleague would be incompatible with at least one of the specified meeting prerequisites, location prerequisites, and/or data and technological requirements. In certain aspects, system 142 may take no action to modify stored data (e.g., within data repository 146) that associated the boundary creation request with user 110 and client device 112.

In certain aspects, the disclosed embodiments may be configured to provide one or more of the exemplary proximity detection and notification processes described above in response to a detected triggering event or condition. For example, one or more components of a notification system associated with a notification entity (e.g., system 142 of notification entity 150) may execute stored instructions to monitor sensor data received from devices associated with one or more triggering entities (e.g., triggering devices 122 and/or 132 of triggering entities 120 and/or 132), to determine geographic positions, speeds, and/or travel directions of these triggering devices based on the monitored sensor data, and further, to determine whether a geographic position of at least one of the triggering devices intersects or falls within a virtual boundary established about a target location.

In some instances, system 142 may be configured (e.g., by the executed instructions) to detect an existence of a triggering condition when the position of the at least one triggering device intersects or falls within the virtual boundary. In response to the detected triggering condition, system 142 may be further configured to generate and transmit a notification (e.g., using any of the exemplary techniques described above) one or more user devices (e.g., client device 112 of user 112), which may notify corresponding users of the detected triggering condition and advise the corresponding users to travel to the target location in order to arrive before one or more of the triggering entities. In certain aspects, and as described above, system 142 may be configured by the instructions to detect the existence of the triggering condition and generate and transmit appropriate notifications autonomously and without intervention from any of the corresponding users (e.g., user 110).

The disclosed embodiments are, however, not limited to triggering conditions defined by a proximity of one or more triggering devices to an established virtual boundary. For example, one or more of the triggering devices may represent devices of customers of a financial institution, and one or more of the user devices may represent devices held or operated by individuals employed by or representing the financial institution. Further, in some instances, the target location may represent an office of the financial institution at which a scheduled appointment, such as a scheduled meeting. may be held and attended by the customers, representatives, and employees of the financial institution, and these customers, representatives, and employees may be travelling from their homes, places of business, etc., to attend the scheduled meeting.

As described above, various external conditions, such as weather events, unexpected traffic or transit delays, and/or fire and other emergency activity at the target location or along travel routes, may prevent one or more of the customers, representatives, or employees from arriving at the target location in time for the scheduled meeting. In some embodiments, outlined below in reference to FIG. 7, system 142 may be configured to detect an occurrence of one or more external conditions without input from the one or more customers, representatives, and employees, establish the detected external condition as a triggering condition, and perform operations in response to the detected triggering condition that generate and transmit notifications to devices within a geographic region and additionally or alternatively, adaptively reschedule and/or relocate the scheduled meeting.

Figure 7:
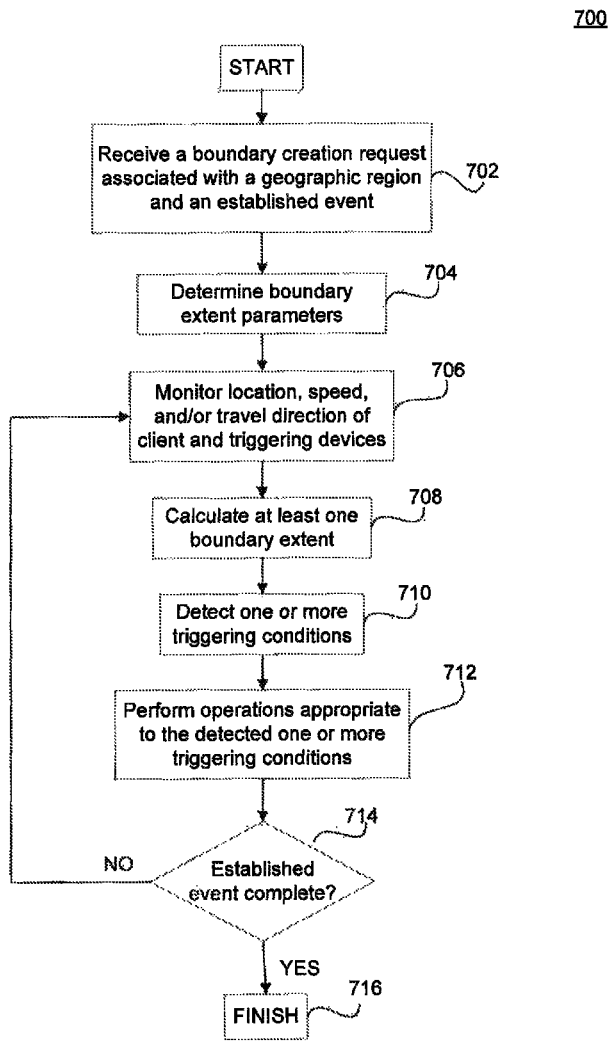
FIG. 7 depicts a flowchart for an additional exemplary proximity notification process consistent with the disclosed embodiments

FIG. 7 is a flowchart of an additional exemplary proximity detection and notification process 700, consistent with the disclosed embodiments. In certain aspects, one or more components of a computer system associated with a notification entity (e.g., system 142 of notification entity 150) may execute stored software instructions to monitor geographic locations, speeds, and/or positions of multiple devices within a geographic region (e.g., client device 112, triggering device 122, and/or triggering device 132) relative to a target location associated with an event. In further aspects, system 142 may be configured to detect a triggering condition corresponding to an occurrence of an external condition (e.g., a weather event within the geographic region, fire and/or other emergency activity within the geographic region, transit-based delays, etc.) that would prevent one or more of the multiple devices from arrival at the target location at an expected arrival time. In response to the detected triggering condition, system 142 may be configured to perform operations that include, but are not limited to, generating and transmitting notifications to at least one of the devices of the detected triggering condition, rescheduling the event to reflect the triggering conditions, and further, relocating the event within the geographic region.

In certain aspects, system 142 may be configured to receive, from client device 112 across network 125, a request (e.g., a boundary creation request) that system 142 monitor geographic locations, speeds, and/or positions of various devices within a geographic region relative to one or more target locations associated with events (e.g., in step 702). In some instances, client device 112 may be configured to present, to user 110, a web page or other graphical user interface (GUI) associated with notification entity (e.g., a mobile application executed by client device 112 and provided by notification entity 150) that enables user 110 to provide input identifying the devices and the events (e.g., locations, times, etc.), which client device 112 may package into the boundary creation request and transmit to system 142 over network 125 using any of the exemplary techniques described above.

In some aspects, and as described above, the received request may identify client device 112 associated with user 110 (and additionally or alternatively, one or more additional client device associated with additional users within the geographic region) and further, may identify the one or more target locations, corresponding events, and details associated with the events (e.g., scheduled times, attendees, meeting-based and/or location-based prerequisites, data requirements, etc.). Further, in additional aspects, and as described above, the received request may also identify one or more triggering devices related to the event (e.g., triggering devices 122 and/or 132).

For example, system 142 may receive, from client device 112, a boundary creation request identifying a scheduled meeting at user 110's office (i.e., the target location) having attendees that include user 110 and multiple customers of user 110 (e.g., triggering entities 120 and/or 130). In certain aspects, the received request may also identify client device 112 and corresponding triggering devices associated with the multiple customers (e.g., triggering devices 122 and/or 132). Using any of the exemplary techniques described above, system 142 may be configured to receive the boundary creation request from system 142 and extract the information identifying the target location, client device 112, and triggering device 122 and 132, portions of which system 142 may store in a data repository (e.g., data repository 146).

In further aspects, system 142 may execute stored instructions to determine and obtain one or more boundary extent parameters associated with received boundary creation request, the event, and/or the monitored devices (e.g., in step 704). In certain aspects, and as described above, boundary extent parameters consistent with the disclosed embodiments may include, but are not limited to, information characterizing one or more virtual boundaries associated with the one or more target locations and/or monitored devices, positional information associated with client device 112 (e.g., the requesting device), and positional information associated with triggering devices 122 and/or 132.

By way of example, and using any of the exemplary techniques described above, system 142 may be configured to establish communications with one or more of the monitored devices (e.g., client device 112 and triggering devices 122 and/or 132) over network 125 to obtain at least a portion of the boundary extent information, which system 142 may store in data repository 146. System 142 may also be configured to obtain boundary extent information from other computing systems in communications with system 142 across network 125 (e.g., from systems and/or data repositories associated with a social network, traffic monitoring service, weather service, etc., through a corresponding API). For instance, and using portions of the obtained boundary extent parameters, system 142 may be configured to calculate an expected arrival time of client device 112 at the target location, and additionally or alternatively, expected arrival times of triggering devices 122 and/or 132 at the target locations.

Further, and as described above, client device 122, triggering device 122, and/or triggering device 132 may include on-board positional sensors (e.g., GPS units) that detect current geographic locations, speeds, travel directions, altitudes, and other positional data corresponding to respective ones of the devices. In some aspects, client device 122, triggering device 122, and/or triggering device 132 may be configured to broadcast positions of the positional data obtained through these sensors to system 142 at regular or predetermined internals and additionally or alternatively, in response to a corresponding signal transmitted by system 140.

Using any of the exemplary techniques described above, system 142 may be configured to monitor the positional data broadcast by client device 122, triggering device 122, and/or triggering device 132 to determine corresponding current geographic locations, speeds, travel directions, etc., of the client device 122, triggering device 122, and/or triggering device 132 as these devices move throughout the geographic region (e.g., in step 706). System 142 may, in some instances, be configured to store portions of the received positional data in data repository 146 to establish a positional data log for corresponding ones of client device 122, triggering device 122, and/or triggering device 132 (e.g., including data records including raw or processes portions of the received positional data).

By way of example, system 142 may be configured to extract the geographic locations, speeds, and/or travel directions from the received positional data and/or compute one or more of the geographic locations, speeds, and/or travel directions based on the received positional data and portions of the stored positional data logs. Based on the received positional data and the boundary extent parameters, system 142 may also be configured to determine arrival times of client device 122, triggering device 122, and/or triggering device 132 at the at least one target location (e.g., expected arrival times), and additionally or alternatively, modify one or more previously determined arrival times for reflect changes in geographic position, speed, and travel direction for one or more of client device 122, triggering device 122, and/or triggering device 132.

In certain aspects, and using any of the exemplary techniques described above, system 142 may execute the stored instructions to calculate extents of one or more virtual boundaries associated with corresponding ones of the at least one target location (e.g., in step 708). By way of example, each of the computed virtual boundaries may enclose a portion of the geographic region that includes a corresponding target location, and an extent and/or shape of each of the computed virtual boundaries may be associated with the expected arrival time of one or more of triggering device 122 and/or 132 at the target location. For instance, system 142 may establish a virtual boundary that encloses a portion of the geographic region that includes user 110's office, and the extents of the established virtual boundary may be calculated to ensure that, when one or more of the customer devices (e.g., triggering devices 122 and/or 132) intersects the establish virtual boundary, current travel conditions will enable user 110 to arrive at the meeting location (i.e., user 110's office) prior to any of the customers attending the meeting. Further, and as described above, system 142 may continually monitor positional data received from client device 112 and triggering devices 122 and/or 132, and in response to the changes in geographic location, speed, and/or travel direction, dynamically update and refresh the calculated extents of at least one of the established virtual boundaries (e.g., as described above in reference to FIGS. 3B, 3C, and 3D).

Further, system 142 may also detect an occurrence of one or more triggering conditions associated with or that impact the expected arrival times of client device 110 and/or triggering devices 122 and 132 at the at least one target location (e.g., in step 710). In response to the one or more detected triggering conditions, system 142 may be further configured to perform one or more proximity detection and notification operations that are appropriate to the detected triggering conditions, the events, and/or the monitored devices and corresponding users (e.g., in step 712). For example, proximity detection and notification processes consistent with the disclosed embodiments may include, but are not limited to, generating and transmitting appropriate notifications to client device 112, triggering device 122, and/or triggering device 132, dynamically updating and refreshing the calculated extents of at least one previously established virtual boundary, and further, modifying one or more parameters or characteristics of the previously established meeting (e.g., scheduled meeting time, scheduled attendees, and/or a scheduled location).

For example, and as described above, system 142 may determine based on the received positional data that triggering device 122 intersects a virtual boundary surrounding a target location (e.g., associated with a scheduled meeting to be attended by user 110 and triggering entity 120). In some aspects, and using any of the exemplary techniques described above, system 142 may establish that the determined intersection represents a triggering condition (e.g., in step 710), and system 142 may be configured to generate and transmit a notification to client device 112 that alerts user 110 to the determined intersection and advises user 110 to begin travelling toward to the target location (e.g., in step 712).

Further, and by way of example, system 142 may monitor positional data received from client device 112, and may compute an updated expected arrival time of client device 112 at a target location based on the received positional data using any of the exemplary techniques described above. In some aspects, and as described above, system 142 may determine that a current geographic location, speed, and/or travel direction of client device 112 results in an expected arrival time at the target location that falls subsequent to a start time of the event (e.g., that user 110 will arrive at the meeting location ten minutes after a 9:30 a.m. scheduled start time). In further aspects, system 142 may determine that, based on a current geographic location, speed, and/or travel direction of triggering device 122 (e.g., or triggering device 132, or any other comparable device in the geographic region) results, triggering device 122 is expected to arrive at the target location subsequent to the scheduled start time.

System 140 may, in certain aspects, determine that the determined delay in user 110's expected arrival at the target location (and additionally or alternatively, the delayed arrival of triggering device 122) represents a triggering condition (e.g., in step 710). For example, using any of the exemplary techniques described above, system 142 may generate and transmit notifications to client device 112, triggering device 122, and/or triggering device 132 that alert user 110, triggering entity 130, and/or triggering entity 130 to user 110's anticipated delay (e.g., in step 712). Additionally or alternatively, system 142 may also determine whether to "hand-off" the scheduled meeting to one or more of user 110's colleagues that are available at the scheduled meeting time using any of the exemplary techniques described above (e.g., in step 712).

The disclosed embodiments are, however, not limited to triggering conditions that established by system 142 on the basis of monitored geographic locations, speeds, and/or travel directions of devices disposed within the geographic region. In further aspects, consistent with the disclosed embodiments, system 142 may identify an occurrence of one or more external conditions (e.g., weather events, unexpected traffic or transit delays, and/or fire and other emergency activity at the target location of along travel routes)

that may prevent one or more of client device 112, triggering device 122, and/or triggering device 132 from arriving at the target location or locations at the expected arrival times and additionally or alternatively, the would prevent the event from occurring at the scheduled time.

In an embodiment, system 142 may be configured to detect the occurrence of at least one of the external conditions and establish the at least one detected external condition as a triggering condition (e.g., in step 710). By way of example, system 142 may establish communications with one or more computer systems or data repositories maintained by third-party data providers, such as local police departments, local fire departments, state or local transportation departments, local news providers, and/or national weather services (e.g., across network 125 through corresponding application programming interfaces (APIs)). In some aspects, the computer systems or data repositories associated with the third-party data providers may be configured to broadcast, across network 125, information identifying various incidents that occur within a particular geographic region (e.g., fire and/or police activity, weather incidents, transit delays, etc.), and system 142 may be configured to receive the broadcasted information and identify the occurrence of these incidents as triggering conditions consistent with the disclosed embodiments (e.g., in step 710). For example, system 140 may be configured to receive information identifying locations of fire and police activity, portions of the geographic region experiencing traffic congestion, and/or occurrences and geographic extents of severe weather alerts and warnings.

In other aspects, and as described above, system 142 may be configured to identify the occurrence of one or more of the external conditions based on social-networking data received and monitored by system 142 (e.g., from various social-networking computing systems across network 125). For example, system 142 may subscribe to data feeds broadcast by a social-networking computer system at regular intervals (e.g., a Twitter™ data feed), and based on an analysis of the received data, system 142 may identify a location of traffic congestion within the geographic region, and additionally or alternatively, may identify a location and extent of police or fire department activity at a particular location (e.g., street closures related to an on-going building fire). The disclosed embodiments are, however, not limited to techniques that detect triggering conditions based on information received from systems and repositories associated with third-party data providers (e.g., fire and police department systems, weather service systems, social-networking systems, etc.), and in further embodiments, system 142 may detect one or more of the triggering conditions based on any additional or alternate information, including data received from one or more of client device 112, triggering device 122, and/or triggering device 132.

In response to the detection of a triggering condition associated with at least one of the external conditions (e.g., in step 710), system 142 may execute stored instructions to perform one or more proximity detection and notification operations consistent with the disclosed embodiments (e.g., in step 712). In some aspects, based on information characterizing the nature and extent of the detected triggering condition, system 142 may determine an impact of the detected triggering condition on travel within the geographic region and additionally or alternatively, an impact of the detected triggering condition on operations at one or more of the target locations (e.g., in step 712).

For example, system 142 may detect an occurrence of police activity on a major thoroughfare within the geographic region (e.g., in step 710), and may determine, based on information received from computer systems associated with a local transportation department and/or from a social network, that the police activity results in a thirty-minute delay for travelers approaching the thoroughfare (e.g., in step 712). Additionally or alternatively, system 142 may detect a triggering condition corresponding to a delay on one or more transit lines disposed proximate to the target location (e.g., in step 710), and may process social-networking data (e.g., tweets from a local transit agency) to determine that the detected transit delay adds approximately ten minutes to trips taken by passengers on the transit line. Further, by way of example, system 140 may detect a triggering condition corresponding to a fire alarm at the target location (e.g., user 110's office) based on information received from a computer system maintained by a local fire department (e.g., in step 710), and may determine that the triggering condition may impact travel and/or events scheduled at the target location of an unknown amount of time (e.g., in step 712). The disclosed embodiments are, however, not limited to these exemplary triggering conditions and exemplary delays, and in further embodiments, system 142 may be configured to detect any additional or alternate triggering condition, and to determine any additional or alternate impact of a detected triggering condition, that would be appropriate to the triggering conditions, the received information, and/or the geographic region.

In an embodiment, and in response to the detected triggering condition and its determined impact, system 142 may perform one or more operations that delay or reschedule the event to accommodate the impact of the detected triggering condition (e.g., in step 712). In some aspects, and as described above, the event may be associated with event-based prerequisites, location-based prerequisites, and/or data requirements, and the determination of system 142 to delay or reschedule the event may be based on a consistency of the delayed or rescheduled event with these event-based prerequisites, location-based prerequisites, and/or data requirements. In further aspects, and to facilitate the delay or rescheduling of the event, system 140 may access one or more calendaring applications and/or systems associated with the attendees of the event and or a location of the event (e.g., an Outlook™ calendar maintained by a corresponding device or systems on behalf of user 110, triggering entities 120 and 130, and/or a conference room user 110's office), which may identify available time periods and/or resources available for a potentially delayed or rescheduled event.

Additionally, in other aspects, system 142 may selectively determine whether to delay or reschedule the event in step 712 based on the impact of the detected triggering event on an ability of user 110 and/or triggering entities 120 and 130 to arrive at the target location at the corresponding expected arrival times. For example, system 142 may determine that the event may be delayed for up to a threshold time period (e.g., ten minutes, fifteen minutes, etc.), which may be established by system 142 (and/or notification entity 150) based on a flexibility in schedules and availability of user 110, triggering entities 120 and 130, and/or one or more resources required for the event.

In certain aspects, if the detected triggering impact delays an arrival of one or more of user 110 and/or triggering entities 120 and 130 for a time period less than the threshold time period, system 142 may determine in step 712 to delay the event until each of the attendees arrives at the target location. In certain aspects, and using any of the exemplary techniques outlined above, system 142 may generate and transmit a notification identifying the delay of the event to client device 112, triggering device 122, and/or triggering device 132. Further, in some instances, system 142 may also provide information identifying the event and the delay to one or more systems that provide electronic calendaring services for client device 112, triggering device 122, and/or triggering device 132, which may update corresponding electronic calendars to reflect the delay. In additional aspects, system 142 may update stored data identifying the event to account for the delay (e.g., in data repository 146), and may continue to receive and monitor positional data associated with current geographic locations, speeds, and/or travel direction to provide proximity detection and notification processes to client device 112, triggering device 122, and/or triggering device 132 in accordance with the delay.

In other aspects, if the detected triggering impact delays the arrival of one or more of user 110 and/or triggering entities 120 and 130 for a time period greater the threshold time period, system 142 may determine in step 712 to reschedule the event for another day and/or time. By way of example, system 142 may be configured to access calendar data indicative of an availability of client device 112, triggering device 122, triggering device 132, and of one or more resources required for the event. In some instances, system 142 may select a potential new time and date for the event that comport with the schedules of client device 112, triggering device 122, and/or triggering device 132, and further satisfy one or more of the location-based prerequisites, event-based prerequisites, and data requirements outlined above. System 142 may generate and transmit a notification identifying the current delay and proposed new date and/or time to client device 112, triggering device 122, and/or triggering device 132 (e.g., either directly or through appointment messages generated and transmitted by one of more of the accessed calendaring systems). Upon acceptance of the proposed new date and/or time by user 110, triggering entity 120, and/or triggering entity 130, system 142 may update stored data identifying the event to account for the new date and/or time (e.g., in data repository 146), and may continue to receive and monitor positional data associated with current geographic locations, speeds, and/or travel direction to provide proximity detection and notification processes to client device 112, triggering device 122, and/or triggering device 132 in accordance with the new date and/or time of the event.

Further, in some aspects, and subsequent to the delay or the rescheduling of the event, system 142 may determine in step 712 that one or more of user 110, triggering entity 120, and/or triggering entity 130 arrive at the target location prior to the delayed or rescheduled start time of the event. For example, the target location may correspond to a meeting of user 110 and several customers (e.g., triggering entities 120 and 130) in user 110's office at 9:30 a.m. on Jul. 2, 2015. Due to police activity, and using any of the exemplary techniques outlined above, system 142 may determine that user 110 and at least one of the customers will arrive at user 110's office by 9:50 a.m., and may determine to delay the start time of the meeting from 9:30 a.m. to 10:00 a.m. to accommodate the expected delay (e.g., in steps 710 and 712, above). Despite the police activity, however, one of the customers may arrive at user 110's office at 9:40 a.m., i.e., twenty minutes before the delayed start of the meeting.

In one embodiment, system 142 may detect the customer's early arrival at the target location (e.g., based on monitored positional data received from a corresponding device of the customer), and further, using any of the exemplary techniques described above, may establish an additional virtual boundary about the target location (i.e., user 110's location) that reflects the expected arrival time of user 110 at the target location. In certain aspects, the establishment of the additional virtual boundary may enable the customer, who arrived twenty minutes early, to briefly leave user 110's office to purchase coffee and/or perform other business with the knowledge that, upon receipt of a notification from system 142 on a corresponding device, the customer may travel back to the user 110's office and arrive in advance of or concurrently with user 110.

In additional embodiments, and in response to the detected triggering condition and the determined impact, system 142 may perform one or more operations that relocate the event to a new location (e.g., in step 712). For example, and as described above, system 142 may receive information indicative of a fire alarm at user 110's office, which system 142 may establish as a triggering event that impacts an ability of user 110 and the one or more customers to conduct the meeting at the target location (e.g., in step 712). In some aspects, in step 712, system 140 may access mapping data (e.g., as stored within database 146 or as obtained from a system or data repository maintained by an external mapping service through a corresponding API), and in conjunction with the monitored positional data, identify travel routes taken by user 110 and triggering entities 122 and/or 132 within the geographic region.

Based on the obtained mapping data, the identified travel routes, and the current positional data, system 142 may identify in step 712 one or more candidate alternate locations for the event that are convenient and accessible to the current geographic locations of user 110 and triggering entities 122 and/or 132 (e.g., as established by the geographic locations of devices 112, 122, and/or 132). In some aspects, system 142 may access stored data identifying one or more location-specific prerequisites, event-specific prerequisites, and/or data requirements associated with the event, and may further determine whether any of the candidate alternate event locations satisfy the identified location-specific prerequisites, event-specific prerequisites, and/or data requirements.

By way of example, and as described above, the event may correspond to a meeting at user 110's office between user 110 and several customers. Further, in some instances, user 110 may schedule the meeting (e.g., and provide the boundary creation request to system 142) and may establish one or more of the location-specific prerequisites, event-specific prerequisites, and/or data requirements (e.g., as input to client device 112, which may transmit the input to system 142). For example, user 210 may establish location- and event-specific prerequisites that include, but are not limited to, an ability to accommodate three individuals (e.g., user 110 and two customers) and to provide unsecured network access (e.g., access to a publicly available WiFi network). Further, in other instances, user 110 may specify data requirements for the meeting that include, but are not limited, access to one or more legal and financial documents that may be in the possession of user 110. The disclosed embodiments are these exemplary location-specific prerequisites, event-specific prerequisites, and/or data requirements, and in further embodiments, user 110 and/or notification entity 150 may specify any additional or alternate location-specific prerequisites, event-specific prerequisites, and/or data requirements appropriate to the event and the participants.

Further, in step 712, system 142 may determine whether one or more of the candidate alternate locations satisfy the identified location-specific prerequisites, event-specific prerequisites, and/or data requirements associated with the event. If system 142 were to identify multiple candidate alternate locations that satisfy the identified location-specific prerequisites, event-specific prerequisites, and/or data requirements, system 142 may be further determine whether at least one of the candidate alternate locations is proximate to the current geographic location of client device 112, triggering entity 120, and/or triggering entity 130. For example, system 142 may establish a candidate alternate location as "proximate" to client device 112, triggering entity 120, and/or triggering entity 130 when that candidate alternate location is disposed within a threshold distance or threshold travel time of client device 112, triggering entity 120, and/or triggering entity 130 (e.g., one kilometer, five minutes, etc.).

If system 142 were to establish that at least one of the candidate alternate locations satisfies the location-specific prerequisites, event-specific prerequisites, and/or data requirements associated with the event, and additionally or alternatively, that the at least one candidate alternate location is proximate to client device 112, triggering entity 120, and/or triggering entity 130, system 140 may further generate and transmit a notification identifying the triggering condition (e.g., the fire alarm) at the at least one candidate alternate location to client device 112, triggering device 122, and/or triggering device 132. In some aspects, the generated notification may be transmitted to client device 112, triggering device 122, and/or triggering device 132 using any of the exemplary techniques described above. Alternatively, the notification may correspond to an appointment message generated and transmitted by one of more of the accessed calendaring systems described above.

For example, system 142 may determine that a coffee shop represents an alternate candidate location along user 110's travel route (e.g., as established by position data transmitted to system 142 by client device 112), and that the coffee shop can accommodate three people (i.e., user 110 and the two customers) and also provides an accessible WiFi network to its customers. Further, system 142 may also determine that the identified coffee shop is located within a threshold distance (e.g., one kilometer) of the current geographic positions of client device 112, triggering device 122, and/or triggering device 132. In some aspects, and as described above, system 142 may generate and transmit, in step 712, a notification identifying the coffee shop as an alternate meeting location that avoids the fire alarm at user 110's office to client device 112, triggering device 122, and/or triggering device 132 using any of the exemplary techniques described above.

As described above, the disclosed embodiments enable system 142 to perform various operations in response to a detection of an occurrence of a triggering condition within a geographic region, which include, but are not limited to, delaying a start time of a previously scheduled event, rescheduling the event to an alternate time and/or day, and further, relocating the event to an alternate location within a geographic region (e.g., in step 712 of FIG. 7). System 142 may, in certain instances, perform a single one of these operations in response to the detected triggering condition (e.g., delaying the start time, rescheduling the event, or relocating the event). In other aspects, and consistent with the disclosed embodiments, system 142 may be configured to perform a plurality of these operations in response to the detected triggering condition and based on a determine impact of the detected triggering condition on the event and/or one or more parties. For example, and in response to one or more external events occurring within the geographic region, system 142 may be configured to not only relocate the event to an alternate location proximate to the parties, but may also reschedule and/or delay the relocated event.

Further, in the embodiments described above, the exemplary proximity detection and notification processes may be configured to monitor relative geographic locations, speeds, and/or travel directions of various client devices and various triggering devices within a geographic region. For example, as described above, these client and triggering devices may be held by or be associated with various parties, such as users, business entities, governmental entities, etc. The disclosed embodiments are, however, not limited to any specific number of client devices (e.g., client device 112) or number of triggering devices (e.g., triggering devices 122 or 132). In further aspects, system 142 may be configured to provide proximity detection and notification processes consistent with the disclosed embodiments to any additional or alternate number of client or triggering devices associated with any additional or alternate partiers, which may be associated with boundary creation requests submitted for any number of appointments or meetings (e.g., a single meeting, multiple consecutive meetings, etc.).

In some aspects, the disclosed embodiments may be configured to perform delivery proximity and notification processes for parties attending previously scheduled meetings and/or parties facilitating and/or awaiting previously scheduled deliveries and/or arrivals of repair crews, cable crews, etc. The disclosed embodiments are, however, not limited to these exemplary events, and in other aspects, an event associated with the exemplary proximity detection and notification processes may include any additional or alternate appointment (e.g., a meeting, etc.) having a scheduled start time and/or a scheduled location.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A system, comprising:
   a storage device; and
   at least one processor coupled to the storage device, the storage device storing instructions for controlling the at least one processor when executed by the at least one processor, the at least one processor being operative with the instructions to:
   determine a first boundary extent parameter relevant to expected arrival times of a client device and a triggering device at a first location of an event;
   monitor the client device and the triggering device to obtain first boundary extent information reflecting the first boundary extent parameter, the client device and the triggering device being connected to the system across a corresponding network;
   calculate, based on the first boundary extent information, a first boundary extent delimiting a first geographical area of a first boundary disposed about the first location;

detect an occurrence of a triggering condition impacting a movement of the client device or the triggering device within a geographic region that includes the first location;

in response to the detected triggering condition, determine a (i) a modified start time for the event or (ii) a second location for the event; and transmit a first notification to the client device and the triggering device, the first notification comprising information identifying the modified start time or the second location, the information instructing the client device and the triggering device to present the first notification through corresponding interfaces;

detect whether the triggering device is located within the first boundary extent;

determine whether the first boundary extent information has triggered an alert condition; and transmit a second notification to the client device when the triggering device is detected within the first boundary extent, and when the alert condition is determined to be triggered, the condition specifying conditions under which the client device should receive the second notification, and the alert condition including a location distance condition reflecting a distance between the first location and the triggering device or a late condition reflecting that the triggering device is expected to arrive at the first location after the corresponding one of the expected arrival times.

2. The system of claim 1, wherein the triggering condition comprises an external factor occurring within the geographic region.

3. The system of claim 1, wherein the triggering condition is associated with the first location, the triggering condition affecting the event at the first location.

4. The system of claim 1, wherein the at least one processor is further configured to:
compute, based on the first boundary extent information, the expected arrival times of the client device and triggering device at the first location;
determine that the expected arrival time of the client device or the expected arrival time of the triggering device falls subsequent to a start time of the event; and
compute the modified start time in accordance with the expected arrival times, the modified start time being subsequent to the expected arrival time of the client device or the expected arrival time of the triggering device.

5. The system of claim 4, wherein the at least one processor is further configured to:
determine that the modified start time for the event comports with a prerequisite associated with the event or a data requirement associated with the event; and
in response to the determination that the modified start time comports with the prerequisite or the data requirement, transmit the first notification identifying the modified start time to the client device and the triggering device.

6. The system of claim 5, wherein the at least one processor is further configured to obtain information identifying the prerequisite or the data requirement from the client device.

7. The system of claim 4, wherein the at least one processor is further configured to:
compute delays associated with the expected arrival times of the client device and the triggering device at the first location, the delays reflecting differences between corresponding ones of the expected arrival times and the start time;
determine whether a maximum of the delays exceeds a threshold value; and
compute the modified start time when the maximum delay is determined not to exceed the threshold value.

8. The system of claim 7, wherein the at least one processor is further configured to:
when the maximum delay is determined to exceed the threshold value, identify a proposed alternate date or a proposed alternate time for the event;
transmit a third notification to the client device and the triggering device, the third notification comprising information identifying the proposed alternate date or time;
receiving responses to the third notification from the client device and the triggering device; and
based on the received responses, perform operations that reschedule the event to the proposed alternate date or time.

9. The system of claim 1, wherein the at least one processor is further configured to:
identify, based on the first boundary extent information, candidate second locations for the event;
determine that a corresponding one of the candidate second locations comports with a prerequisite associated with the event or a data requirement associated with the event; and
in response to the determination that the corresponding one of the candidate second locations comports with the prerequisite or the data requirement, establish the corresponding one of the second candidate locations as the second location.

10. The system of claim 1, wherein the at least one boundary extent parameter includes: a location parameter reflecting a location of the triggering device; a speed parameter reflecting a speed of the triggering device; a direction parameter reflecting a direction of the triggering device; a traffic parameter reflecting traffic conditions between the triggering device and the first location; a modified time parameter reflecting a duration of time preceding a time at which the triggering device is expected to reach the first location; or a priority parameter reflecting an expected latent period associated with the triggering devices.

11. The system of claim 1, wherein the first boundary is associated with the expected arrival time of the triggering device at the first location.

12. The system of claim 1, wherein the at least one processor is further configured to receive a first boundary creation request to establish the first boundary around the first location, the first request specifying the triggering device.

13. The system of claim 12, wherein the at least one processor is further configured to:
receive a request to establish a second boundary around the first location, the second boundary reflecting a calculated difference in the expected arrival time at the first location of the triggering device and an expected arrival time at the first location of an additional triggering device;
calculate a second boundary extent delimiting a geographical area of the second boundary;
determine whether the triggering device or the additional triggering device is located within the second boundary extent; and transmit the second notification to the client device, when the triggering device or the additional triggering device is determined to be located within the second boundary extent.

14. The system of claim 1, wherein the triggering includes an additional client device or a device associated with a non-human entity.

15. The system of claim 1, wherein the at least one processor is further configured to obtain information associated with the triggering device from a social networking site.

16. A computer-implemented method, comprising:
determining, by one or more processors, a first boundary extent parameter relevant to expected arrival times of a client device and a triggering device at a first location of an event;
monitoring, by the one or more processors, the client device and the triggering device to obtain first boundary extent information reflecting the first boundary extent parameter;
calculating, by the one or more processors, and based on the first boundary extent information, a first boundary extent delimiting a first geographical area of a first boundary disposed about the first location;
detecting, by the one or more processors, an occurrence of a triggering condition impacting a movement of the client device or the triggering device within a geographic region that includes the first location;
in response to the detected triggering condition, determining, by the one or more processors, a (i) a modified start time for the event or (ii) a second location for the event; and
transmitting, by the one or more processors, a first notification to the client device and the triggering device, the first notification comprising information identifying the modified start time or the second location, the information instructing the client device and the triggering device to present the first notification through corresponding interfaces;
detecting, by the one or more processors, whether the triggering device is located within the first boundary extent;
determining, by the one or more processors, whether the first boundary extent information has triggered an alert condition; and
transmitting, by the one or more processors, a second notification to the client device when the triggering device is detected within the first boundary extent, and when the alert condition is determined to be triggered, the condition specifying conditions under which the client device should receive the second notification, and the alert condition including a location distance condition reflecting a distance between the first location and the triggering device or a late condition reflecting that the triggering device is expected to arrive at the first location after the corresponding one of the expected arrival times.

17. The computer-implemented method of claim 16, wherein the at least one triggering condition comprises an external factor occurring within the geographic region.

18. The computer-implemented method of claim 16, wherein the triggering condition is associated with the first location, the triggering condition affecting the event at the first location.

19. The computer-implemented method of claim 16, further comprising:

based on the first boundary extent information, computing, by the one or more processors, the expected arrival times of the client device and the triggering device at the first location;
determining, by the one or more processors, that the expected arrival time of the client device or the expected arrival time of the triggering device falls subsequent to a start time of the event; and
computing, by the one or more processors, the modified start time in accordance with the expected arrival times, the modified start time subsequent to the expected arrival time of the client device or the expected arrival time of the triggering device.

20. The computer-implemented method of claim 19, further comprising:
determining, by the one or more processors, that the modified start time for the event comports with a prerequisite associated with the event or a data requirement associated with the event; and
in response to the determination that the modified start time comports with the prerequisite or the data requirement, transmitting, by the one or more processors, the first notification identifying the modified start time to the client device and the triggering device.

21. The computer-implemented method of claim 20, further comprising obtaining, by the one or more processors, information identifying the prerequisite or the data requirement from the client device.

22. The computer-implemented method of claim 19, further comprising:
computing, by the one or more processors, delays associated with the expected arrival times of the client device and triggering device at the first location, the delays reflecting differences between corresponding ones of the expected arrival times and the start time;
determining, by the one or more processors, whether a maximum of the delays exceeds a threshold value; and
computing, by the one or more processors, the modified start time when the maximum delay is determined not to exceed the threshold value.

23. The computer-implemented method of claim 22, further comprising:
when the maximum delay is determined to exceed the threshold value, identifying, by the one or more processors, a proposed alternate date or a proposed alternate time for the event;
transmitting, by the one or more processors, a second notification to the client device and the triggering device, the second notification comprising information identifying the proposed alternate date or time;
receiving, by the one or more processors, responses to the second notification from the client device and the triggering device; and
based on the received responses, performing, by the one or more processors, operations that reschedule the event to the proposed alternate date or time.

24. The computer-implemented method of claim 16, further comprising:
based on the first boundary extent information, identifying, by the one or more processors, candidate second locations for the event;
determining, by the one or more processors, that a corresponding one of the candidate second locations comports with a prerequisite associated with the event or a data requirement associated with the event; and
in response to the determination that the corresponding one of the candidate second locations comports with the prerequisite or the data requirement, establishing, by the one or more processors, the corresponding one of the second candidate locations as the second location.

25. The computer-implemented method of claim 16, wherein the first boundary extent parameter includes: a location parameter reflecting a location of the triggering device; a speed parameter reflecting a speed of the triggering device; a direction parameter reflecting a direction of the triggering device; a traffic parameter reflecting traffic conditions between the triggering device and the first location; a modified time parameter reflecting a duration of time preceding a time at which the triggering device is expected to reach the first location; or a priority parameter reflecting an expected latent period associated with the triggering device.

26. The computer-implemented method of claim 16, wherein the first boundary is associated with the expected arrival time of the triggering device at the first location.

27. The computer-implemented method of claim 16, further comprising receiving, by the one or more processors, a first boundary creation request to establish the first boundary around the first location, the first request specifying the triggering device.

28. The computer-implemented method of claim 27, further comprising:
receiving, by one or more processors, a request to establish a second boundary around the first location, the second boundary reflecting a calculated difference in the expected arrival time at the first location of the triggering device and an expected arrival time at the first location of an additional triggering device;
calculating, by the one or more processors, a second boundary extent delimiting a geographical area of the second boundary;
determining, by the one or more processors, whether the triggering device or the additional triggering device is located within the second boundary extent; and
when the triggering device or the additional triggering device is determined to be located within the second boundary extent, transmitting, by the one or more processors, the second notification to the client device.

29. The computer-implemented method of claim 16, wherein the triggering device includes an additional client device or a device associated with a non-human entity.

30. A tangible, non-transitory computer-readable medium storing instructions that, when executed by at least one processor, cause the at least one processor to perform a method, comprising:
determining a first boundary extent parameter relevant to expected arrival times of a client device and a triggering device at a first location of an event;
monitoring the client device and the triggering device to obtain first boundary extent information reflecting the first boundary extent parameter;
calculating, based on the first boundary extent information, a first boundary extent delimiting a first geographical area of a first boundary disposed about the first location;
detecting an occurrence of a triggering condition impacting a movement of the client device or the triggering device within a geographic region that includes the first location;
in response to the detected triggering condition, determining a (i) a modified start time for the event or (ii) a second location for the event;
transmitting a first notification to the client device and the triggering device, the first notification comprising information identifying the modified start time or the second location, the information instructing the client device and the triggering device to present the first notification through corresponding interfaces;
detecting whether the triggering device is located within the first boundary extent;
determining whether the first boundary extent information has triggered an alert condition; and
transmitting a second notification to the client device when the triggering device is detected within the first boundary extent, and when the alert condition is determined to be triggered, the alert condition specifying conditions under which the client device should receive the second notification, and the alert condition including a location distance condition reflecting a distance between the first location and the triggering device or a late condition reflecting that the triggering device is expected to arrive at the first location after the corresponding one of the expected arrival time.

31. A system, comprising:
a storage device; and
at least one processor coupled to the storage device, the storage device storing instructions for controlling the at least one processor when executed by the at least one processor, the at least one processor being operative with the instructions to:
receive a first boundary creation request to establish a first boundary about a first location of an event, the first request specifying a first triggering device and a second triggering device;
determine a first boundary extent parameter relevant to expected arrival times of a client device and of the first and second triggering devices at the first location of the event;
monitor the client device and the first and second triggering devices to obtain boundary extent information reflecting the first boundary extent parameter, the client device and the first and second triggering devices being connected to the system across a corresponding network;
calculate a first boundary extent delimiting a first geographical area of the first boundary based on the boundary extent information;
detect an occurrence of a triggering condition impacting a movement of the client device, the first triggering device, or the second triggering device within a geographic region that includes the first location;
determine a (i) a modified start time for the event or (ii) a second location for the event in response to the detected triggering condition; and
transmit a first notification to the client device, the first triggering device, and the second triggering device, the first notification comprising information identifying the modified start time or the second location, the information instructing the client device and the first and second triggering devices to present the first notification through corresponding interfaces;
detect whether the first triggering device or the second triggering device is located within the first boundary extent;
receive a request to establish a second boundary around the first location, the second boundary reflecting a calculated difference in the expected arrival times at the first location of the first triggering device and the second triggering device;

calculate a second boundary extent delimiting a geographical area of the second boundary;
determine whether the first triggering device or the second triggering devices is located within the second boundary extent; and
transmit a third notification to the client device, when the first triggering device or the second triggering device is determined to be located within the second boundary extent, and when the first triggering device or the second triggering device is detected within the first boundary extent.

32. A computer-implemented method, comprising:
receiving, by one or more processors, a first boundary creation request to establish a first boundary about a first location of an event, the first request specifying a first triggering device and a second triggering device;
determining, by one or more processors, a first boundary extent parameter relevant to expected arrival times of a client device and of the first and second triggering devices at the first location of the event;
monitoring, by one or more processors, the client device and the first and second triggering devices to obtain boundary extent information reflecting the first boundary extent parameter, the client device and the first and second triggering devices being connected to the system across a corresponding network;
calculating, by one or more processors, a first boundary extent delimiting a first geographical area of the first boundary based on the boundary extent information;
detecting by one or more processors, an occurrence of a triggering condition impacting a movement of the client device, the first triggering device, or the second triggering device within a geographic region that includes the first location;
determining, by one or more processors, a (i) a modified start time for the event or (ii) a second location for the event in response to the detected triggering condition; and
transmitting, by one or more processors, a first notification to the client device, the first triggering device, and the second triggering device, the first notification comprising information identifying the modified start time or the second location, the information instructing the client device and the first and second triggering devices to present the first notification through corresponding interfaces;
detecting, by one or more processors, whether the first triggering device or the second triggering device is located within the first boundary extent;
receiving, by one or more processors, a request to establish a second boundary around the first location, the second boundary reflecting a calculated difference in the expected arrival times at the first location of the first triggering device and the second triggering device;
calculating, by one or more processors, a second boundary extent delimiting a geographical area of the second boundary;
determining, by one or more processors, whether the first triggering device or the second triggering devices is located within the second boundary extent; and
transmitting, by one or more processors, a third notification to the client device, when the first triggering device or the second triggering device is determined to be located within the second boundary extent, and when the first triggering device or the second triggering device is detected within the first boundary extent.

* * * * *